United States Patent
Mauger et al.

(10) Patent No.: US 12,191,780 B2
(45) Date of Patent: Jan. 7, 2025

(54) SOFT-SWITCHING CURRENT SOURCE INVERTERS

(71) Applicant: Georgia Tech Research Corporation, Atlanta, GA (US)

(72) Inventors: Mickael J. Mauger, Atlanta, GA (US); Rajendra Prasad Kandula, Atlanta, GA (US); Deepak M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/753,290

(22) PCT Filed: Aug. 26, 2020

(86) PCT No.: PCT/US2020/047882
§ 371 (c)(1),
(2) Date: Feb. 25, 2022

(87) PCT Pub. No.: WO2021/041465
PCT Pub. Date: Mar. 4, 2021

(65) Prior Publication Data
US 2024/0014749 A1    Jan. 11, 2024

Related U.S. Application Data

(60) Provisional application No. 62/891,791, filed on Aug. 26, 2019.

(51) Int. Cl.
*H02M 7/48*    (2007.01)
*H02M 1/00*    (2006.01)
(Continued)

(52) U.S. Cl.
CPC ....... *H02M 7/4826* (2013.01); *H02M 1/0058* (2021.05); *H02M 1/126* (2013.01); *H02M 5/458* (2013.01); *H02M 7/5387* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 4,942,511 A    7/1990 Lipo et al.
5,280,421 A    1/1994 De Doncker et al.
(Continued)

FOREIGN PATENT DOCUMENTS

WO    2017/201209 A1    11/2017

OTHER PUBLICATIONS

Jacobina et al., "Pulsed DC-Link Current Converters—a Review", Oct. 1997, IEEE, pp. 1406-1413 (Year: 1997).*
(Continued)

*Primary Examiner* — Jeffrey A Gblende
(74) *Attorney, Agent, or Firm* — Troutman Pepper Hamilton Sanders LLP; Ryan A. Schneider; Dustin B. Weeks

(57) ABSTRACT

The present disclosure relates to current source inverters (CSIs), and in particular to soft-switching current source inverters (SSCSIs). An exemplary CSI comprises a first CSI bridge, a second CSI bridge, a DC-link inductor, and a resonant tank. The first CSI bridge can be operatively connected to a first power bank. The second CSI bridge can be operatively connected to a second power bank. The DC-link inductor can be connected in series between the first and second CSI bridges. The resonant tank can be connected in parallel with the DC-link inductor.

37 Claims, 19 Drawing Sheets

(51) Int. Cl.
*H02M 1/12* (2006.01)
*H02M 5/458* (2006.01)
*H02M 7/5387* (2007.01)

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 5/458; H02M 5/453; H02M 5/44; H02M 5/42; H02M 5/40; Y02B 70/1491

See application file for complete search history.

(56) References Cited

U.S. PATENT DOCUMENTS

| | | | | |
|---|---|---|---|---|
| 5,412,557 | A * | 5/1995 | Lauw | H02M 7/4826 363/40 |
| 5,559,685 | A * | 9/1996 | Lauw | H02M 7/4826 363/37 |
| 10,491,098 | B2 * | 11/2019 | Chen | H02M 5/225 |
| 11,594,919 | B2 * | 2/2023 | Enderlin | G01V 3/104 |
| 2009/0085510 | A1 | 4/2009 | Pande et al. | |
| 2017/0201209 | A1 | 7/2017 | Imada | |
| 2018/0026544 | A1 * | 1/2018 | Baumann | H02M 5/458 318/504 |

OTHER PUBLICATIONS

International Search Report and Written Opinion from Applicatin No. PCT/US2020/047882 dated Nov. 20, 20202.

Chen, et al., "Soft-Switching Solid-State Transformer (S4T)," IEE Transactions on Power Electronics, vol. 33, No. 4 May 24, 2017 pp. 2933-2947.

Mauger, et al., "Soft-Switching Current Source Inverter for Next-Generation Electric Vehicle Drivetrains," 2020 IEEE Transportation Electrification Conference & Expo (ITEC).

Supplementary Search Report from European Application No. 20856716.4 dated Jul. 20, 2023.

Da Silva, et al., "Pulsed DC-Link Current Converters—a Review," 1997 Industry Applications Conference Thirty-Second IAS Annual Meeting, IAS '97 Conference Record of the 1997 IEEE New Orleans, LA Oct. 5-9, 1997 vol. 2, pp. 1406-1413.

Office Action from JP Application No. 2022-512754 dated Jul. 23, 2024.

* cited by examiner

FIG. 1 *(Prior Art)*

SOFT-SWITCHING CURRENT SOURCE INVERTERS

CROSS-REFERENCE TO RELATED APPLICATIONS

This application claims the benefit of U.S. Provisional Application No. 62/891,791, filed 26 Aug. 2019, and entitled "Soft-Switching Current Source Inverters," which is incorporated by reference herein in its entirety.

FIELD OF DISCLOSURE

The present disclosure relates to electric power inverters, and more particularly to soft-switching current source inverters.

BACKGROUND

Variable speed motor drives (VSD) are a $20B+/year industry with numerous applications, ranging from the vast majority of industrial processes to transportation electrification. Variable speed motor drives allow motors to run at the speed and/or torque required for a particular application. VSDs can connect to 3-phase AC systems, single-phase AC systems, or DC sources (electric vehicles) at their input and generate a 3-phase AC system at their output to power and control a motor. The prevalent VSD configuration makes use of two back-to-back voltage source converters (VSC), linked by a common voltage DC-link. A conventional 3-phase to 3-phase VSC-based implementation is shown in FIG. 1.

Large DC-link capacitors are often required to ensure proper control of the VSCs, limiting the achievable power density, which is especially critical in transportation electrification applications. Further, the voltage-source nature of the converters leads to large short-circuit currents, in case of a short on the DC bus, or a fault in the motor windings, making the short-circuit protection of the semiconductors difficult and hampering the VSD reliability.

VSC-based VSDs generate high-frequency switching voltages at their input/output and cause large amount of electromagnetic interferences (EMI) that can disturb sensitive electronics and processes. Additionally, there is typically no line inductor filter on the output side and the motor inductance is used to filter the switching voltages into usable line-currents, generating additional motor losses and complexifying the motor design.

Further, it is well-known that VSC-based VSDs generate high level of common mode voltage, leading to premature degradation of the motor's bearings and windings insulation, and often requiring additional bulky and costly common-mode mitigation filters.

Moreover, the recent industry push towards higher performances using newer wide-bandgap technologies such as silicon carbide (SiC) devices as mere 'drop-in' replacement in existing VSC topologies has been hampered by the very high switching speed of these newer devices. Switching dv/dt an order of magnitude higher than in conventional silicon devices are commonly reported and creates or worsen an array of issues in the form of additional electromagnetic interferences (EMI), additional motor losses, and voltage reflections. These require complex, expensive, lossy and bulky mitigation techniques, typically in the form of EMI filters representing up to 30% of the converter volume, largely limiting the potential system-level gains from the lower switching losses and higher operating temperatures offered by these new power switches technologies.

Current source inverters (CSI), once the preferred conversion structure, have a number of advantages over VSIs in motor drive applications including lower common-mode voltage generation, sinusoidal filtered output voltage waveforms without the need for line inductors leading to lower machine losses, and natural immunity to short-circuit faults. Despite these inherent qualities, the topology suffers from larger conduction losses than its VSI counterpart and lower efficiencies for the same processed power are routinely observed. In addition, CSIs typically operate at lower switching frequencies where large passive elements are required and exhibit poor dynamic performance. As a result, VSIs are the preferred topology for drivetrain applications nowadays, which come with the aforementioned disadvantages.

SUMMARY

The present disclosure relates to current source inverters (CSIs), and in particular to soft-switching current source inverters (SSCSIs). An exemplary embodiment of the present disclosure provides a CSI, comprising a first CSI bridge, a second CSI bridge, a DC-link inductor, and a resonant tank. The first CSI bridge can be operatively connected to a first power bank. The second CSI bridge can be operatively connected to a second power bank. The DC-link inductor can be connected in series between the first and second CSI bridges. The resonant tank can be connected in parallel with the DC-link inductor.

In any of the embodiments disclosed herein, the first power bank can be configured to source power.

In any of the embodiments disclosed herein, the first power bank can be configured to sink power.

In any of the embodiments disclosed herein, the first power bank can be configured to both source and sink power.

In any of the embodiments disclosed herein, the second power bank can be configured to source power.

In any of the embodiments disclosed herein, the second power bank can be configured to sink power.

In any of the embodiments disclosed herein, the second power bank is configured to both source and sink power.

In any of the embodiments disclosed herein, the CSI can further comprise a leakage management diode connected in series between the resonant tank and the DC-link inductor.

In any of the embodiments disclosed herein, the resonant tank can comprise a resonant capacitor, and resonant inductor, and a resonant switch.

In any of the embodiments disclosed herein, the resonant capacitor can be connected in parallel with the DC-link inductor.

In any of the embodiments disclosed herein, the resonant inductor can be connected in series with the resonant switch.

In any of the embodiments disclosed herein, the serially connected resonant switch and resonant inductor can be connected in parallel with the resonant capacitor.

In any of the embodiments disclosed herein, the resonant switch can be a reverse blocking switch.

In any of the embodiments disclosed herein, the first CSI bridge can comprise two or more legs, wherein each of the two or more legs can comprise two reverse blocking switches connected in series.

In any of the embodiments disclosed herein, the second CSI bridge can comprise two or more legs, wherein each of the two or more legs can comprise two reverse blocking switches connected in series.

In any of the embodiments disclosed herein, the CSI can further comprise one or more filter capacitors connected between the two or more legs of the first CSI bridge.

In any of the embodiments disclosed herein, the CSI can further comprise one or more filter capacitors connected between the two or more legs of the second CSI bridge.

In any of the embodiments disclosed herein, the CSI can further comprise one or more inductors connected in series between the first power bank and the two or more legs of the first CSI bridge.

In any of the embodiments disclosed herein, the CSI can further comprise one or more inductors connected in series between the second power bank and the two or more legs of the second CSI bridge.

In any of the embodiments disclosed herein, one or more of the reverse blocking switches can comprise a controllable switch connected in series to a diode.

In any of the embodiments disclosed herein, one or more of the controllable switches can be one of an insulated gate bipolar transistor, a metal oxide semiconductor field effect transistor, a reverse-blocking insulated gate bipolar transistor, and a thyristor.

In any of the embodiments disclosed herein, one or more of the controllable switches can comprise silicon carbide or gallium nitride.

In any of the embodiments disclosed herein, one or more of the diodes can comprise silicon carbide or gallium nitride.

In any of the embodiments disclosed herein, the CSI can be configured to operate in a switching cycle.

In any of the embodiments disclosed herein, the switching cycle can comprise an active phase, wherein during at least a portion of the active phase, power is transferred simultaneously between (a) the first power bank and the DC-link inductor via the first CSI bridge and (b) the second power bank and the DC-link inductor via the second CSI bridge.

In any of the embodiments disclosed herein, the switching cycle can comprise a freewheeling phase during which no power is transferred between the DC-link inductor and the first and second power banks.

In any of the embodiments disclosed herein, the first CSI bridge can comprise a first plurality of switches for delivering electric power between the first power bank and the DC-link inductor, the second CSI bridge can comprise a second plurality of switches for delivering electric power between the second power bank and the DC-link inductor, and the switching cycle can include one or more zero voltage switching transition states during which the first and second pluralities of switches are gated-off, the resonant switch is gated-off, and the current generated by the DC-link inductor flows through the resonant capacitor.

In any of the embodiments disclosed herein, each of the first and second CSI bridges can comprise two or more legs and each of the two or more legs can comprise a first switch and a second switch, wherein during the freewheeling phase, the first and second switches of a first leg of the first CSI are gated on and the first and second switches of a first leg of the second CSI are gated on.

In any of the embodiments disclosed herein, the first CSI bridge can comprise a first plurality of switches for delivering electric power between the first power bank and the DC-link inductor, wherein the second CSI bridge can comprise a second plurality of switches for delivering electric power between the second power bank and the DC-link inductor, and wherein the switching cycle can comprise a resonant phase during which the first and second pluralities of switches are gated off and the resonant switch is gated on, initiating a resonance between the resonant capacitor and the resonant inductor.

In any of the embodiments disclosed herein, the switching cycle can have a switching period, wherein the resonant phase can comprise less than 10% of the switching period.

In any of the embodiments disclosed herein, the CSI can have a DC-link current utilization factor between 0.9 and 1.0.

Another exemplary embodiment of the present disclosure provides a CSI, comprising a first CSI bridge, a second CSI bridge, a DC-link inductor, a first resonant tank, and a second resonant tank. The first CSI bridge can be operatively connected to a first power bank. The second CSI bridge can be operatively connected to a second power bank. The DC-link inductor can be connected in series between the first and second CSI bridges. The resonant tank can be connected in parallel with the first CSI bridge. The second resonant tank can be connected in parallel with the second CSI bridge.

In any of the embodiments disclosed herein, the CSI can further comprise a first leakage management diode connected in series with the first resonant tank.

In any of the embodiments disclosed herein, the CSI can further comprise a second leakage management diode connected in series with the second resonant tank.

In any of the embodiments disclosed herein, the first resonant tank can comprise a first resonant capacitor, a first resonant inductor, and a first resonant switch, and the second resonant tank can comprise a second resonant capacitor, a second resonant inductor, and a second resonant switch.

In any of the embodiments disclosed herein, the first resonant capacitor can be connected in parallel with the first CSI bridge, and the second resonant capacitor can be connected in parallel with the second CSI bridge.

In any of the embodiments disclosed herein, the first resonant inductor can be connected in series with the first resonant switch, and the second resonant inductor can be connected in series with the second resonant switch.

In any of the embodiments disclosed herein, the serially connected first resonant switch and first resonant inductor can be connected in parallel with the first resonant capacitor, and the serially connected second resonant switch and second resonant inductor can be connected in parallel with the second resonant capacitor.

In any of the embodiments disclosed herein, the first resonant switch can be a reverse blocking switch, and the second resonant switch can be a reverse blocking switch.

In any of the embodiments disclosed herein, the first CSI bridge can comprise a first plurality of switches for delivering electric power between the first power bank and the DC-link inductor, the second CSI bridge can comprise a second plurality of switches for delivering electric power between the second power bank and the DC-link inductor, and the switching cycle can comprises a resonant phase during which at least one of the first and second pluralities of switches are gated off and at least one of the first and second resonant switches are gated on, initiating at least one of a resonance between the first resonant capacitor and the first resonant inductor and a resonance between the second resonant capacitor and the second resonant inductor.

In any of the embodiments disclosed herein, the first CSI bridge can comprise a first plurality of switches for delivering electric power between the first power bank and the DC-link inductor, the second CSI bridge can comprise a second plurality of switches for delivering electric power between the second power bank and the DC-link inductor, and the switching cycle can include one or more zero voltage switching transition states during which at least one of the first and second pluralities of switches are gated-off, the first and second resonant switches are gated-off, and the current generated by the first DC-link inductor (or current generated by both the first and second DC-link inductors) flows through at least one of the first resonant capacitor and the second resonant capacitor.

In any of the embodiments disclosed herein, the CSI can further comprise a second DC-link inductor connected in series between the first and second CSI bridges, wherein the second DC-link inductor is not connected in series with the first DC-link inductor.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings

DETAILED DESCRIPTION

To facilitate an understanding of the principles and features of the present invention, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1:
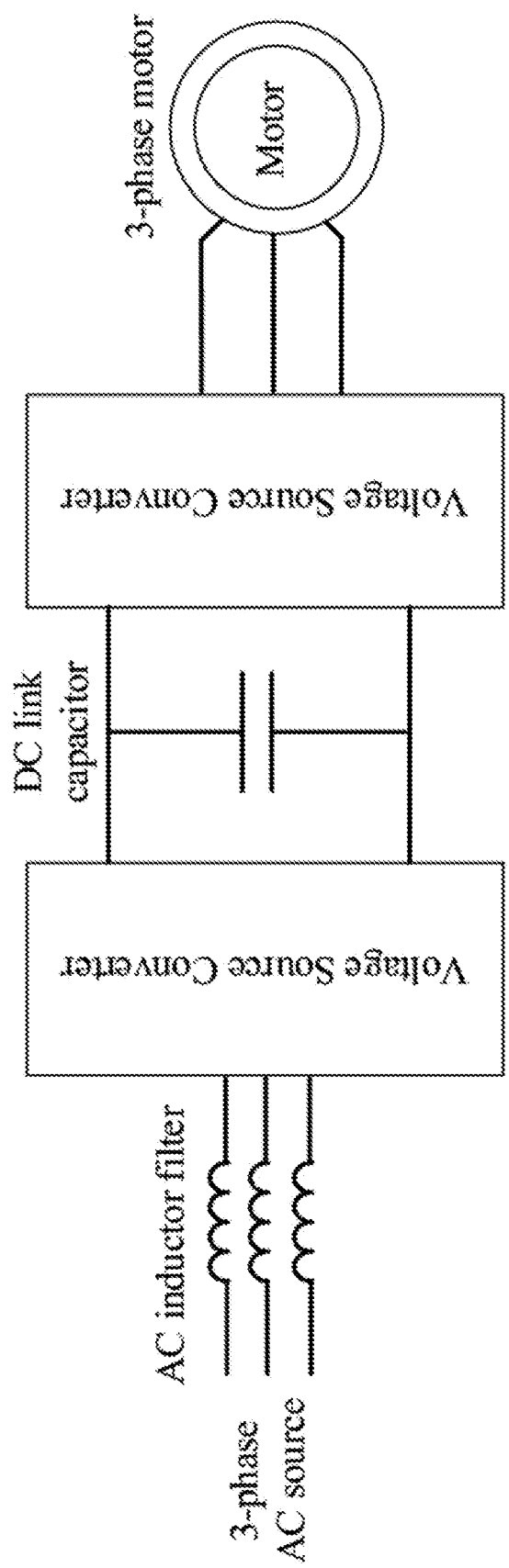
FIG. 1 shows a conventional voltage source inverter, in a back-to-back configuration that can be used for motor drive applications.
Figure 2:
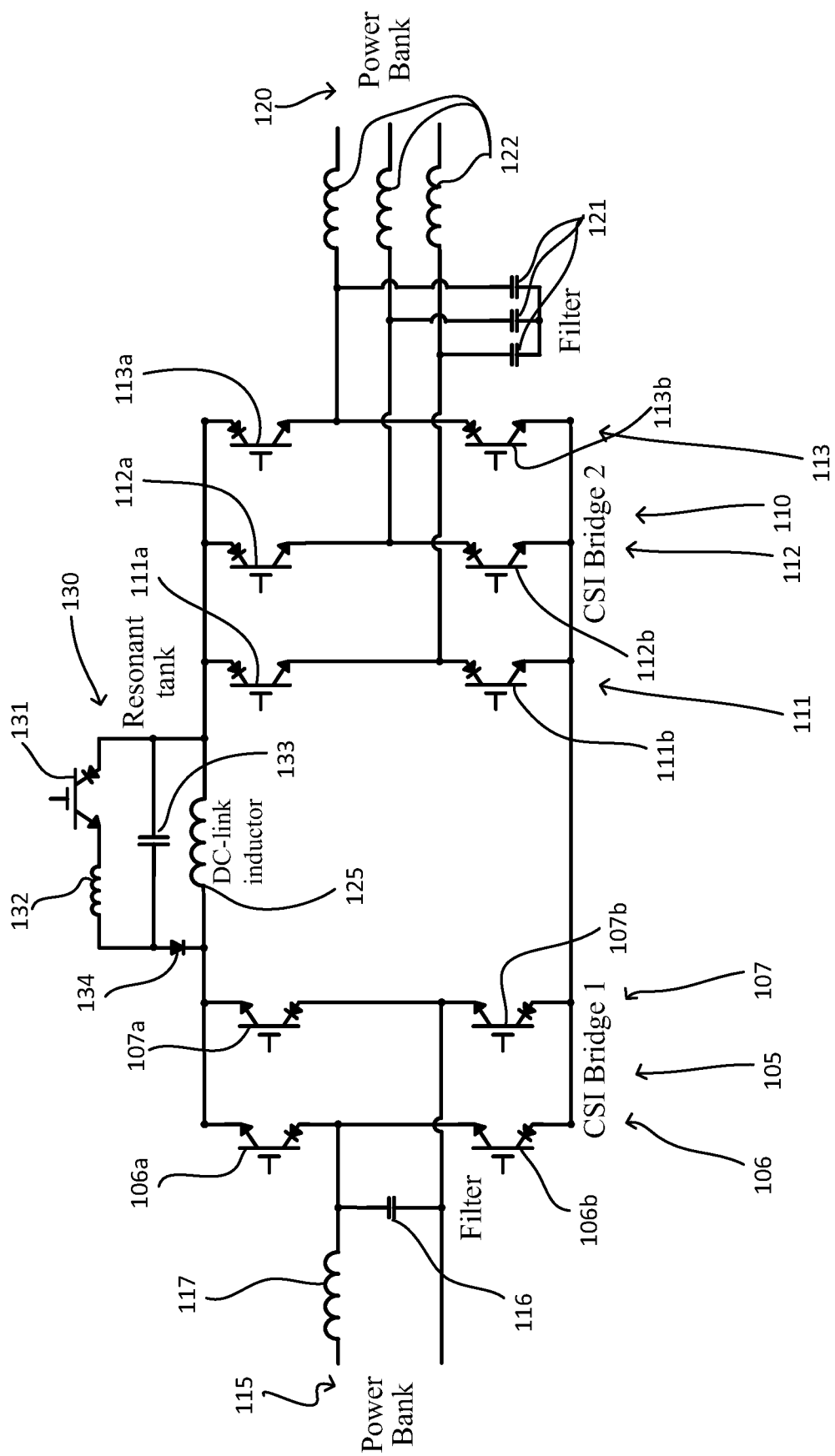
FIG. 2 shows a soft-switching current source inverter, in accordance with an embodiment of the disclosure.
Figure 3:
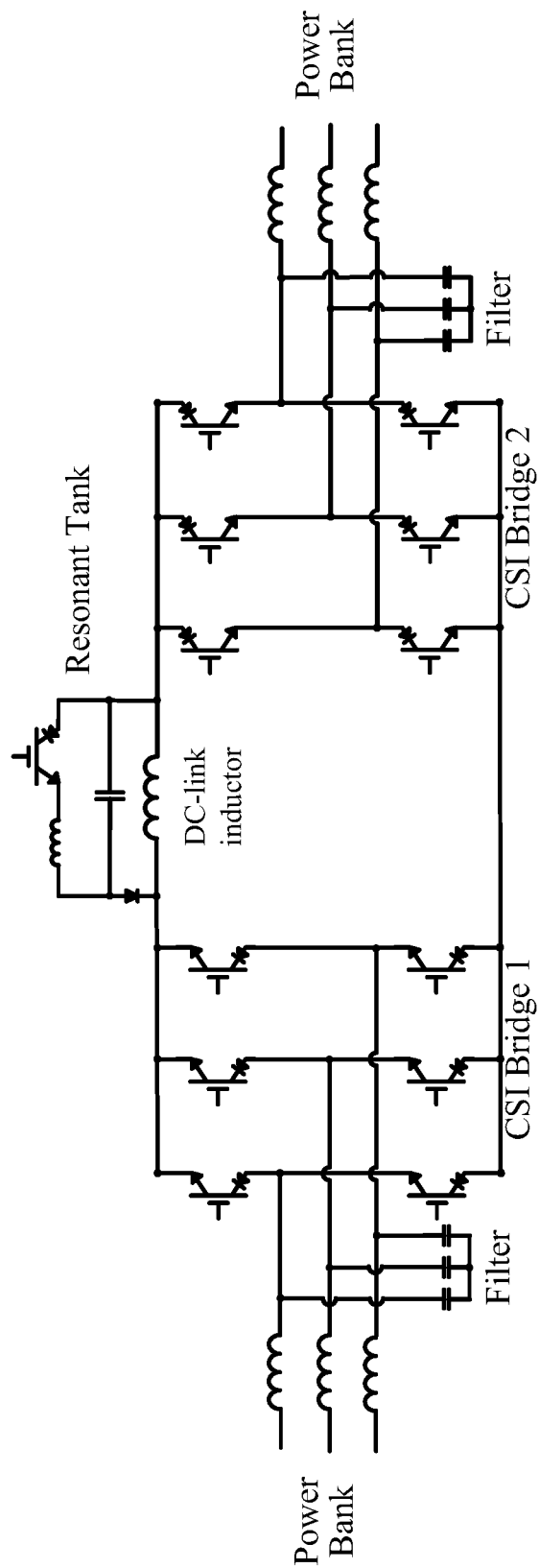
FIG. 3 shows a soft-switching current source inverter, in accordance with an embodiment of the disclosure.
Figure 4:
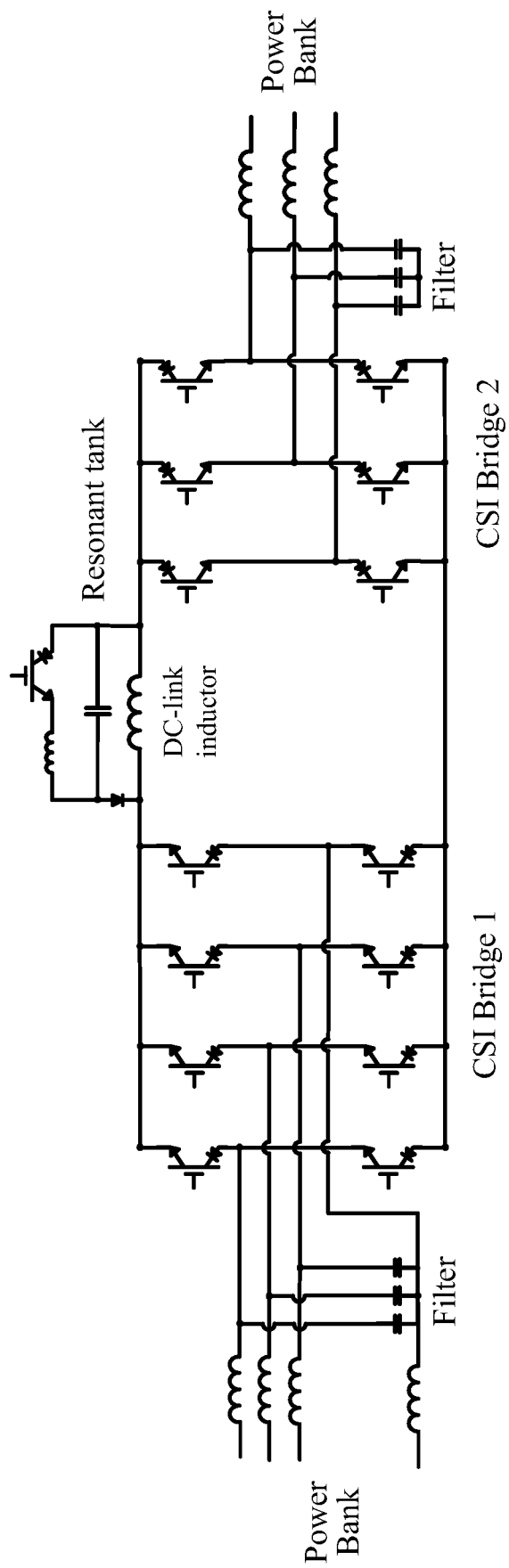
FIG. 4 shows a soft-switching current source inverter, in accordance with an embodiment of the disclosure.

The present disclosure relates to current source inverters (CSIs). As shown in FIG. 2, an exemplary embodiment of the present disclosure provides a soft-switching CSI (SSCSI), comprising a first CSI bridge 105, a second CSI bridge 110, a DC-link inductor 125, and a resonant tank 130. The first CSI bridge 105 can be operatively connected to a first power bank 115. The second CSI bridge can be operatively connected to a second power bank 120. The DC-link inductor 125 can be connected in series between the first 105 and second 110 CSI bridges to provide an amount of energy storage. The resonant tank 130 can be connected in parallel with the DC-link inductor 125. The resonant tank 130 can provide zero-voltage switching conditions for each switch of the first and second CSI bridges.

Figure 8:
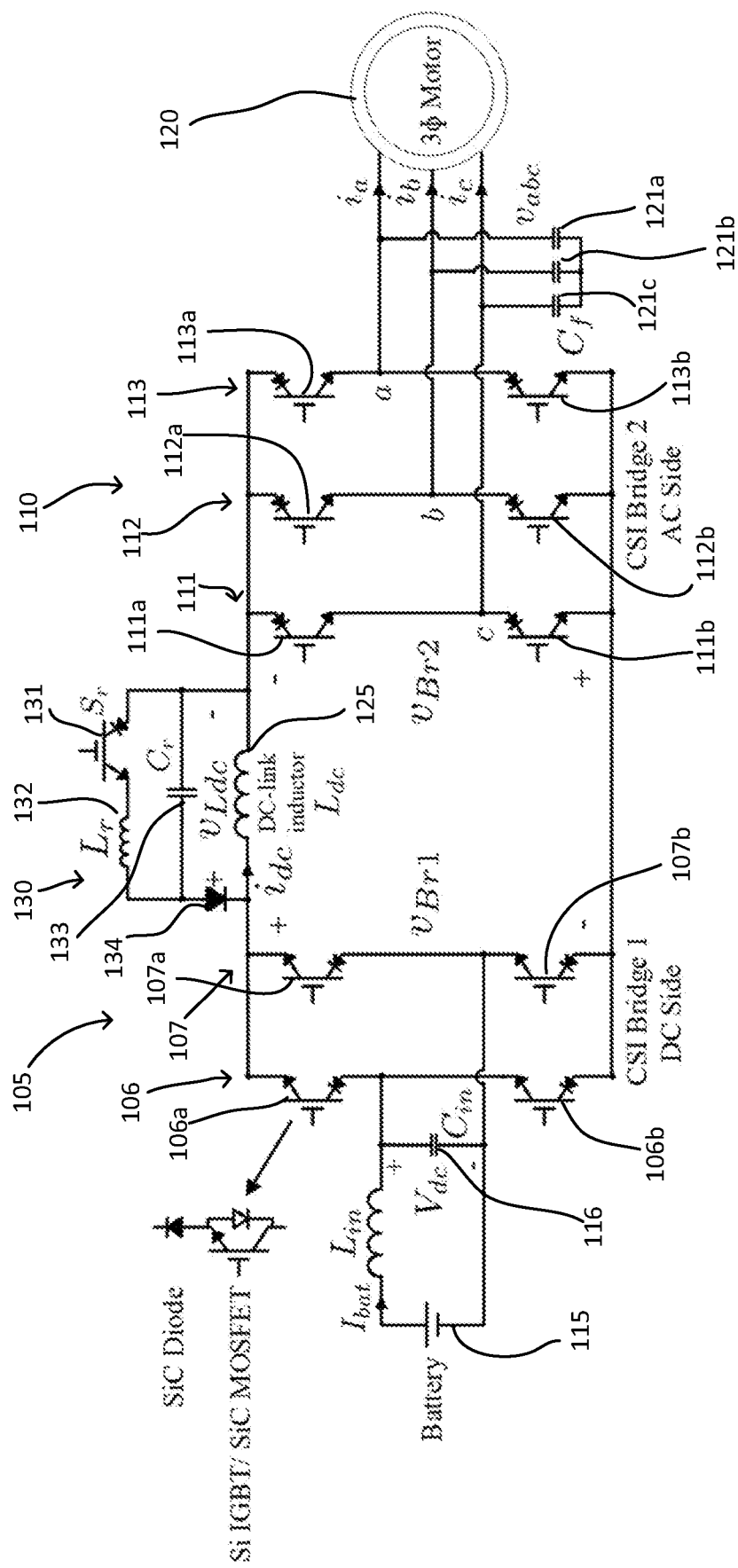
FIG. 8 shows a soft-switching current source inverter, in accordance with an embodiment of the disclosure.

The first and second power banks 115, 120 can be configured to source power (e.g., single-phase AC grid, 3-phase AC grid, 3-phase 4-wire AC grid, DC source, battery, etc.) or sink power (electric loads, electric motors, AC grid, battery etc.). Each of the power banks can use AC and/or DC power. For example, in some embodiments, the first power bank can be a DC battery, and the second power bank can be an electric motor (as shown in FIG. 8). FIGS. 2-7 illustrate CSIs of the present disclosure configured to interface with various power banks. In some embodiments, the SSCSI is bi-directional, such that the first power bank 115 and the second power bank 120 can serve as both power sources and power sinks at different times. Thus, power can flow from the first power bank 115 to the second power bank 120 via the DC-link inductor 125 a portion of the time, and power can flow from the second power bank 120 to the first power bank 115 via the DC-link inductor another portion of the time. Such embodiments can be particularly useful for applications in which regenerative charging of a power source (e.g., DC battery) from a power sink (e.g., electric motor) is desired, or applications where bi-directional power flow is desired.

The DC-link inductor can be many different inductors suitable for operation at high-frequency known in the art, including, but not limited to, air-core inductors, gapped-core inductors, and the like. The magnetic core material can be many different magnetic material suitable for operation at high-frequency, including, but not limited to, ferrite core, amorphous core, nanocrystalline core, powder core, soft-magnetic material, and the like. As persons skilled in the art would understand, the inductance of the DC-link inductor can be selected/varied depending on the application and the desired amount of energy storage during an operating cycle for the SSCSI.

The resonant tank 130 can comprise a resonant capacitor 133, and resonant inductor 132, and a resonant switch 131. As shown in FIG. 2, the resonant capacitor 133 can be connected in parallel with the DC-link inductor 125, the resonant inductor 132 can be connected in series with the resonant switch 131, and the serially connected resonant switch 131 and resonant inductor 132 can be connected in parallel with the resonant capacitor 133. The resonant tank can be used to provide zero-voltage switching conditions (ZVS) for all the switches of all the CSI bridges. The resonant capacitor 133 can offer an additional path for the DC-link current to flow during ZVS transition states (discussed below). The resulting discharge rate of the resonant capacitor can determine/control the dv/dt switching rate of the switches undergoing commutation events and can thus provide ZVS conditions for all the switches of all the CSI bridges.

As shown in FIG. 2, the SSCSI can further comprise a leakage management diode 134 connected in series between the resonant tank 130 and DC-link inductor 125. The leakage management diode can be many different diodes with low reverse recovery known in the art, including, but not limited to, fast recovery diodes, Schottky diodes (Si, SiC, etc.), and the like. The leakage management diode 134 can be used to overcome unwanted and severe resonance issues in the operation of the resonant tank during the zero-voltage switching (ZVS) transitions (discussed below), arising when the leakage/parasitic inductance introduced by the interconnection of the resonant capacitor to the DC-link inductor cannot be kept sufficiently low. The leakage management diode 134 can prevent a current flow of reverse polarity into the resonant tank 130 and consequently the leakage management diode 134 can be effective at damping/preventing the aforementioned unwanted resonance issue. The leakage management diode 134 can be used to overcome the aforementioned unwanted resonance issue with minimum conduction loss increase as the leakage management diode 134 does not carry the main inductor current, but rather current flows through the leakage management diode 134 only during ZVS transitions and/or resonant periods.

The resonant inductor 132 can be many different high quality factor inductors known in the art, including, but not limited to, air-core inductors, core-based inductors, and the like, and can have many different high frequency winding configurations known in the art, including but not limited to, magnet wire, stranded wire, Litz wire, copper foil, and the like. Unlike the DC-link inductor 125, the resonant inductor 132 does not provide energy storage and its size can be significantly smaller in ratings. The resonant capacitor 133 can be many different high quality factor capacitors known in the art, including, but not limited to, film capacitors, ceramic capacitors, and the like. The resonant capacitor 133 does not provide energy storage and only conducts a current during the ZVS transitions and resonance phase so that its size can be significantly smaller than other reactive components of the topology. The resonant switch 131 can be a reverse blocking switch. As used herein, the term "reverse blocking switch" refers to a switch or switch assembly that conducts current in one direction and blocks voltage in both directions. In any of the embodiments described herein, the reverse blocking switch can be a single controllable switch from many different switches known in the art that conducts current in one direction and blocks voltage in both directions, including but not limited to, a thyristor, an integrated gate-commutated thyristor, a gate turn-off thyristor, a reverse-blocking insulated gate bipolar transistor (RB-IGBT), and the like. In any of the embodiments described herein, the reverse blocking switch can also be a switch assembly that comprises a reverse conducting controllable switch (e.g., a IGBT or MOSFET) connected in series with a diode. The controllable switches and diodes can rely on many different semiconductor structures and comprise many different materials, including, but not limited to, silicon, silicon carbide, gallium nitride, wide-bandgap semiconductors and the like.

The first CSI bridge 105 can comprise two or more legs 106, 107. Various embodiments can make use of different numbers of legs (e.g., 2, 3, 4, or more) to interface with single- or multi-terminal DC and single or multi-terminal AC power banks and systems, as shown in FIGS. 2-7.

Each of the legs 106, 107 can comprise two reverse blocking switches, connected in series. For example, the first leg 106 of the first CSI bridge 105 can comprise a first switch 106a connected in series with a second switch 106b, and the second leg 107 of the first CSI bridge 105 can comprise a first switch 107a connected in series with a second switch 107b.

Similarly, as shown in FIGS. 2-7, the second CSI bridge 110 can comprise two or more legs 111, 112, 113. Various embodiments can make use of different numbers of legs (e.g., 2, 3, 4, or more) to interface with single- or multi-terminal DC and single or multi-terminal AC power banks and systems. For example, as shown in FIG. 2, the second CSI bridge 110 comprises three legs 111, 112, 113. Each of the legs 111, 112, 113 can comprise two reverse blocking switches, connected in series. For example, the first leg 111 of the second CSI bridge 110 can comprise a first switch 111a connected in series with a second switch 111b, the second leg 112 of the second CSI bridge 110 can comprise a first switch 112a connected in series with a second switch 112b, and the third leg 113 of the second CSI bridge 110 can comprise a first switch 113a connected in series with a second switch 113b.

As shown in FIG. 2, the SSCSI can further comprise one or more filter capacitors 116 connected between the two or more legs 106, 107 of the first CSI bridge 105. The filter capacitors can serve to provide a path for the high-frequency switching currents and synthetize a filtered terminal voltage with low harmonics.

As shown in FIG. 2, the SSCSI can further comprise one or more filter capacitors 121 connected between the two or more legs of the second CSI bridge. The filter capacitors can serve to provide a path for the high-frequency switching currents and synthetize a filtered terminal voltage with low harmonics.

As shown in FIG. 2, the SSCSI can further comprise one or more filter inductors 117 connected in series between the first power bank and the two or more legs of the first CSI bridge and one or more filter inductors 122 connected in series between the second power bank and the two or more legs of the second CSI bridge. The filter inductors can help further suppressing harmonics.

The SSCSI can be configured to operate in a switching cycle. The operation of the SSCSI during the switching cycle can be realized by a controller to control the various switches in the CSI. The controller can be many controllers known in the art. The controller can comprise a memory and instructions that, when executed by the processor, can cause the controller to control the various switches in the CSI.

Figure 9:
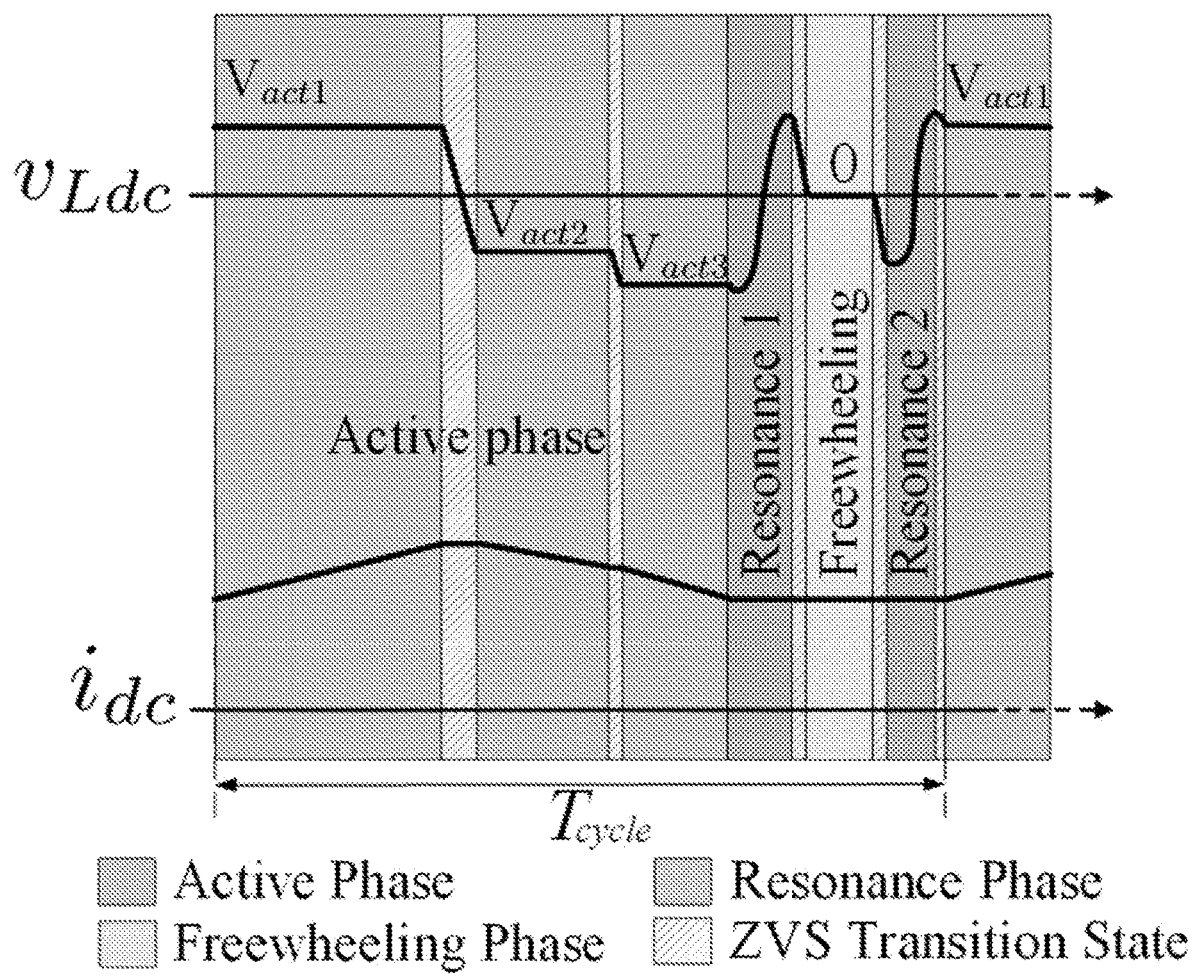
FIG. 9 shows an exemplary switching cycle of a current source inverter, in accordance with an embodiment of the disclosure.

The switching cycle can generally include three phrases and one or more transition states. An exemplary switching cycle is shown in FIG. 9. The switching cycle can comprise an active phase, a freewheeling phase, a resonance phase, and one or more ZVS transition states. During at least a portion of the active phase, power is transferred simultaneously between (a) the first power bank and the DC-link inductor via the first CSI bridge and (b) the second power bank and the DC-link inductor via the second CSI bridge.

During the freewheeling phase, no power is transferred between the DC-link inductor and the first and second power banks. This can be achieved by gating-on both serially-connected switches 106a, 106b of a first leg 106 of the first CSI bridge 105 and both serially-connected switches 111a, 111b of a first leg 111 of the second CSI bridge 110. The serially-connected switches of any of the legs 106, 107 of the first CSI bridge 105 and any of the legs 111, 112, 113 of the second CSI bridge 110 can be gated-on during the freewheeling phase. In some embodiments, the serially-connected switches of only a single leg of the first CSI bridge and a single leg of the second CSI bridge can be gated-on during the freewheeling phase. The freewheeling phase can be used to 'pad' the switching cycle and operate the SSCSI at constant switching frequency.

During the resonance phase, switches in the legs 106, 107 of the first CSI bridge 105 and the legs 111, 112, 113 of the second CSI bridge 110 can be gated-off and the resonant switch 131 can be gated-on. This can initiate a resonance between the resonant capacitor 133 and the resonant inductor 132. In some embodiments, the duration of the resonance phase can be kept to a minimum to increase the efficiency of the SSCSI. For example, in some embodiments, the resonant phase makes up less than 25% of the period of the switching cycle. In some embodiments, the resonant phase makes up less than 20% of the period of the switching cycle. In some embodiments, the resonant phase makes up less than 15% of the period of the switching cycle. In some embodiments, the resonant phase makes up less than 10% of the period of the switching cycle. In some embodiments, the resonant phase makes up less than 5% of the period of the switching cycle. The resonance phase can be used to 'flip' the resonant capacitor voltage, from a negative value to a positive value, and essentially 'reset' the soft-switching operation of the converter.

During the ZVS transition state, all switches of the converter (including all switches of the first CSI bridge 105, all switches of the second CSI bridge 110, and the resonant switch 131), can be gated-off and the DC-link current can flow through the resonant capacitor 133 of the resonant circuit 130. This current flow can discharge the resonant capacitor 133 and the resulting discharge rate of the resonant capacitor can be controlled and limits the dv/dt switching rate of all the switches during the ZVS transition state, after the switches are turned off and before the switches are turned on. The ZVS transition state can be used to provide ZVS condition for all switches turning off and for all switches turning on at any instant during the switching cycle, and under all converter operating conditions.

A more details discussion of the phases and ZVS transition state of an exemplary switching cycle is described in the examples below.

Unlike other resonant converters in the art, the soft-switching CSIs disclosed herein can provide high DC-link current utilization factor with soft-switching operation. The DC-link current utilization factor can be defined as the ratio of the maximum instantaneous current delivered to a power bank by a bridge, to the average of the DC-link current. In some embodiments, the CSI can provide a DC-link current utilization factor between 0.7 and 1.0. In some embodiments, the CSI can provide a DC-link current utilization factor between 0.8 and 1.0. In some embodiments, the CSI can provide a DC-link current utilization factor between 0.9 and 1.0. In some embodiments, the CSI can provide a DC-link current utilization factor between 0.95 and 1.0.

Figure 5:
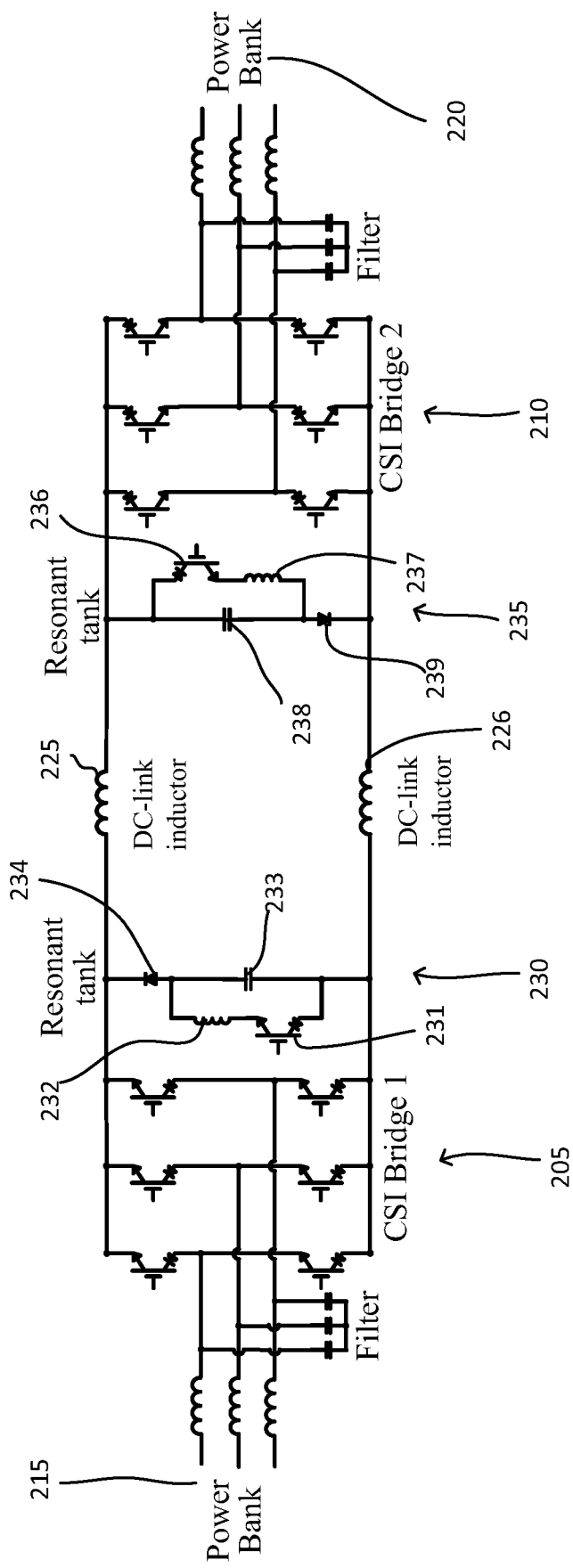
FIG. 5 shows a soft-switching current source inverter, in accordance with an embodiment of the disclosure.
Figure 6:
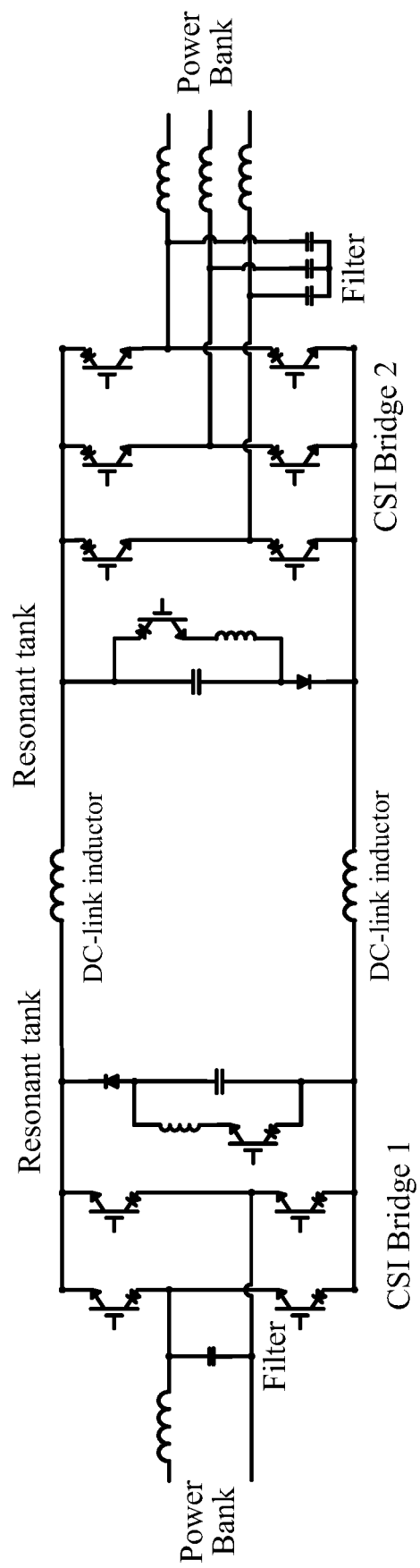
FIG. 6 shows a soft-switching current source inverter, in accordance with an embodiment of the disclosure.
Figure 7:
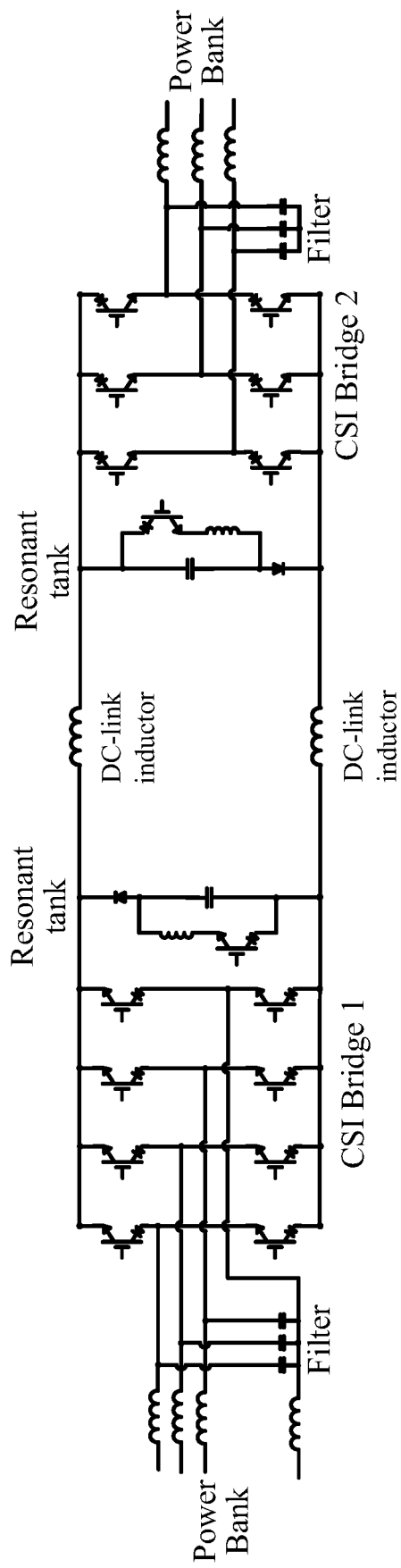
FIG. 7 shows a soft-switching current source inverter, in accordance with an embodiment of the disclosure.

As shown in FIG. 5, another exemplary embodiment of the present disclosure provides a SSCSI, comprising a first CSI bridge 205, a second CSI bridge 210, a first DC-link inductor 225, a first resonant tank 230, and a second resonant tank 235. The first CSI bridge 205 can be operatively connected to a first power bank 215. The second CSI bridge 210 can be operatively connected to a second power bank 220. The first DC-link inductor 225 can be connected in series between the first 205 and second 210 CSI bridges. The first resonant tank 230 can be connected in parallel with the first CSI bridge 205. The second resonant tank 235 can be connected in parallel with the second CSI bridge 210.

The first resonant tank 230 can comprise a first resonant capacitor 233, a first resonant inductor 232, and a first resonant switch 231, and the second resonant tank 235 can comprise a second resonant capacitor 238, a second resonant inductor 237, and a second resonant switch 236.

The resonant capacitors, inductors, and switches, can be similar to the resonant capacitor, inductor, and switch described above. The first resonant capacitor 233 can be connected in parallel with the first CSI bridge 205, and the second resonant capacitor 238 can be connected in parallel with the second CSI bridge 210. The first resonant inductor 232 can be connected in series with the first resonant switch 231, and the second resonant inductor 237 can be connected in series with the second resonant switch 236. The serially connected first resonant switch 231 and first resonant inductor 232 can be connected in parallel with first resonant capacitor 233, and the serially connected second resonant switch 236 and second resonant inductor 237 can be connected in parallel with second resonant capacitor 238.

As shown in FIG. 5, the SSCSI can further comprise a first leakage management diode 234 connected in series with the first resonant tank 230 and a second leakage management diode 239 connected in series with the second resonant tank 235. The leakage management diodes 234, 239 can be used to overcome unwanted and severe resonance issues in the operation of the resonant tanks during the zero-voltage switching (ZVS) transitions, arising when the leakage/parasitic inductance introduced by the connection of the resonant capacitors to the CSI bridges cannot be kept sufficiently low. Unwanted resonance and oscillations between the two resonant tanks can also be triggered under certain conditions.

The leakage management diodes 234, 239 can prevent a current flow of reverse polarity into the resonant tanks 230, 235 and consequently the leakage management diodes 234, 239 can be effective at damping/preventing the aforementioned unwanted resonance issues. The leakage management diodes 234, 239 can be used to overcome the aforementioned unwanted resonance issues with minimum conduction loss increase as the leakage management diodes 234, 239 do not carry the main inductor current, but rather current flows through the leakage management diodes 234, 239 only during ZVS transitions and/or resonant periods.

As shown in FIG. 5, the SSCSI can further comprise a second DC-link inductor 226 connected in series between the first 205 and second 210 CSI bridges, on the opposite side to the first DC-link inductor 225, i.e., the second DC-link inductor 226 is not connected in series with the first DC-link inductor 225. The 'split' DC-link inductor configuration, with two DC-link inductors 225, 226 in the DC-link current path, can be used to lower and symmetrize the common-mode current path, and the common-mode voltage generated by the topology. The configuration can also be used to ease the paralleling of multiple SSCSI converters to serve a common power bank, and can allow for interleaving.

As with the SSCSI in FIG. 2 described above, the SSCSI in FIG. 5 can operate in a switching cycle. The switching cycle can comprise, an active phase, a freewheeling phase, a resonant phase, and a ZVS transition state. During the resonance phase of the switching cycle for the CSI shown in FIG. 5, the switches making up the legs of the first and second CSI bridges are gated-off and at least one of the first resonant switch 231 and the second resonant switch 236 are gated-on, initiating at least one of a resonance between the first resonant capacitor and the first resonant inductor and a resonance between the second resonant capacitor and the second resonant inductor. For example, if the first resonant switch 231 is gated-on, a resonance will be initiated between the first resonant capacitor 233 and the first resonant inductor 232. If the second resonant switch 236 is gated-on, a resonance will be initiated between the second resonant capacitor 238 and the second resonant inductor 237.

The disclosed converter topologies of FIGS. 2-7 can retain the benefits of standard CSI including: 1) bi-directional power flow, 2) voltage step-up and step-down, 3) lower common-mode voltage generation than voltage-source inverter (VSI) counterparts, 4) filtered output voltage waveforms, 5) elimination of inrush current, 6) elimination of shoot-through conditions, and 7) immunity to short-circuit current. In addition, the disclosed converter topologies can improve upon conventional CSI and can provide the following additional functionalities: 1) ZVS soft-switching operation of all the switches of the CSI bridges, 2) higher conversion efficiency, 3) higher switching frequency, 4) reduced DC-link inductance, 5) reduced filter capacitance, 6) reduced and controlled dv/dt switching rate, 7) lower EMI generation and EMI filter requirement, 8) faster converter dynamic, 9) fast dynamic DC-link current level regulation as a function of converter loading level to maximize efficiency, 10) simplified devices switching and transition mechanisms without intentionally added overlap time, and 11) devices do not suffer catastrophic voltage stress when opening the DC-link current path.

The disclosed converter topologies also differ from other conventional resonant converters and can provide the following functionalities: 1) Simple and robust control where pulse-width modulation (PWM) and space vector modulation (SVM) are possible, 2) soft-switching operation across the entire converter voltage, current and power range, 3) fixed switching frequency operation, 4) a single resonant tank can be used to provide ZVS operation of both CSI bridges, 5) the resonant tank is outside the main power path and operate for a small portion of the switching cycle and the resonant elements can thus be rated at a fraction of the main converter reactive elements and the resonant tank undergoes limited losses, 6) the soft-switching operation is possible at high DC-link current utilization factors, above 0.8.

The following examples further illustrate aspects of the present disclosure. However, they are in no way a limitation of the teachings or disclosure of the present disclosure as set forth herein.

EXAMPLES

FIG. 8 provides an exemplary soft-switching CSI (SSCSI) for use for an electric vehicle drivetrain. As shown in FIG. 8, the SSCSI comprises two standard CSI bridges connected through a series DC-link inductor. The bridges' phase-legs, or legs, comprise two reverse blocking switches, realized by the series connection of a SiC diode and a standard Si IGBT, or a SiC MOSFET for higher performance applications. The soft-switching operation of the converter is enabled by a single resonant tank, or resonant circuit, connected across the DC-link inductor. This minimal resonant circuit, relying on a resonant capacitor $C_r$, a resonant inductor $L_r$, and an ancillary switch $S_r$, all rated to handle only a fraction of the processed power, sets the zero-voltage switching (ZVS) conditions for all the power devices of the CSI bridges, throughout the switching cycle, and across the entire voltage, current and power range.

By substantially reducing (and virtually eliminating) the switching losses, the soft-switching operation addresses the higher conversion losses plaguing the conventional CSI, while retaining all of the aforementioned advantages in motor drive applications. Additionally, higher switching frequency operation with PWM modulation is possible, leading to reduced DC-link inductor and filter capacitor sizes and excellent converter dynamic. Finally, the SSCSI topology is fully bi-directional with buck-boost voltage conversion capabilities, offers intrinsic dv/dt control for reduced EMI and maximal utilization of the latest SiC devices, and showcases very high efficiency at high operating frequency. The fundamental working principles of the topology will now be described.

Principle of Operation

Switching Cycle: An exemplary switching cycle of the SSCSI in the DC-to-3-phase AC configuration is shown in FIG. 9. The converter operation can be categorized into three main phases through the cycle: Active, Freewheeling and Resonance.

During the Active phase, the CSI bridges apply a sequence of voltage levels to the DC-link, thereafter referred to as "active vectors," corresponding to one of the available leg-to-leg voltages or a freewheeling state. With the conventions used in FIG. 8, the possible active vectors for Bridge 1, $v_{Br1}$, and Bridge 2, $v_{Br2}$, are:

$$v_{Br1} = \{+V_{dc}, -V_{dc}, 0\} \quad (1)$$

$$v_{Br2} = \{V_{ab}, -V_{ab}, V_{bc}, -V_{bc}, V_{ca}, -V_{ca}, 0\} \quad (2)$$

where, $V_{dc}$ is the DC voltage of the battery, $V_{ab}$, $V_{bc}$, $V_{ca}$ are the three-phase motor line-to-line AC voltages, and 0 is the zero-voltage vector applied by turning ON a full leg of the bridge to freewheel the DC-link current. The resulting voltage, $V_{Ldc}$, across the DC-link inductor and the resonant capacitor is then:

$$v_{Ldc}=v_{Br1}-v_{Br2} \quad (3)$$

Unlike the existing soft-switching solid state transformer (S4T) where the shunt magnetizing inductance is used as a storage element to transfer energy sequentially between the bridges, both bridges of the SSCSI operate simultaneously, leading to a higher utilization factor of the DC-link current and the semiconductors. From (3), it follows that the possible voltage levels across the DC-link inductor and resonant capacitor during the active phase are from the voltage sum of the active vector pairs given by the Cartesian product of sets (1) and (2). Over one switching cycle, the selection, ordering and application time of the active vectors from each bridge can be determined by the modulation strategy. Thus, the number of voltage levels on $V_{Ldc}$ and their polarity during the active phase can be arbitrary and depend on the converter switching states through the switching cycle. In the most general case for this application, three voltage levels are observed on $V_{Ldc}$, identified as $V_{act1}$, $V_{act2}$ and $V_{act3}$ in FIG. 9. However, no specific switching cycle structure is assumed in the derivations of the soft-switching principles detailed below, and the mechanisms presented are valid for all SSCSI implementation variants.

The DC-link current controller enforces the volt-second balance across the inductor and resonant capacitor so that in steady state the following constraint holds true:

$$\langle v_{Ldc}\rangle_{Tsw}=0 \quad (4)$$

where $\langle v_{Ldc}\rangle_{Tsw}$ is the average of $v_{Ldc}$ over one switching period.

In the form described thus far, the principle of operation of the SSCSI during the Active phase is analogous to that of a standard pulse-width modulated CSI. However, additional considerations can be used to enable the soft-switching operation as detailed below.

To ensure a constant switching frequency operation, the switching cycle can be padded with a Freewheeling phase, where the DC-link current is bypassed by selecting a zero-voltage vector for both bridges. This is achieved by turning ON one leg per bridge. It is apparent that no energy transfer is possible during the Freewheeling phase and its duration should therefore be minimized to reduce the converter conduction losses and increase the DC-link utilization. In conventional CSI, the switching frequency is typically kept low to balance the conduction and switching losses and operate at acceptable efficiency levels. This in turn requires large DC-link inductor and leads to poor dynamic performance. As a result, the DC-link current level is typically kept constant or controlled well above the load requirement to maintain good converter response under load variations. In the SSCSI, however, higher switching frequency operation is possible, owing to the soft-switching feature virtually eliminating the switching losses, and the DC-link current level can be changed dynamically within a few switching cycles to adjust to the converter loading level and minimize the freewheeling time. This leads to unique efficiency profiles, as detailed below.

The last converter operation mode is the Resonance phase. In this mode, while all the power switches of the CSI bridges are OFF, the ancillary switch $S_r$ is gated ON, under zero-current switching (ZCS) condition, to initiate a resonance between the resonant capacitor $C_r$ and the resonant inductor $L_r$. At the following zero-crossing of the resonant current flowing through switch $S_r$, the series diode will turn OFF naturally leading to a ZCS turn OFF of the switch. As a first-order approximation, this instant corresponds to half the resonant period of the $L_rC_r$ tank, and the voltage across the resonant capacitor is the opposite of the initial voltage at the beginning of the resonance phase. Thus, this mode of operation essentially provides a simple mechanism to flip the resonant capacitor voltage, and can be triggered at will throughout the switching cycle to enable the soft-switching operation as detailed below. As for the Freewheeling phase, there is no energy exchange with the sources and loads during the Resonance phase and the total resonance duration can therefore be kept to a minimum. This is possible through an appropriate selection of the resonant elements $L_r$ and $C_r$, while considering the voltage and current stress levels during this phase.

Soft-Switching Mechanism: The SSCSI shown in FIG. 8 is a resonant transition converter in that the soft-switching operation is enabled by the single resonant circuit during the switching transitions between the active vectors. Unlike the conventional PWM CSI where great care has to be taken in the gating sequence to continuously provide a path for the DC-link current to flow through the bridges, the resonant capacitor in the SSCSI of FIG. 8 provides an additional current circulation path. This additional path is used in a unique converter state, called the 'ZVS transition state', and inserted between any two adjacent active vectors, as shown in FIG. 9.

Without loss of generality, take the example of a ZVS transition state when Bridge 2 commutates from $v_{Br2}=V_{ac}$ to $v_{Br2}=V_{ab}$, while Bridge 1 applies an arbitrary vector $v_{Br1}$. The corresponding converter switching states, assuming $v_{Br1}=+V_{dc}$, are shown in FIGS. 10A-C.

Further assume that:

$$V_{ab}<V_{ac} \quad (5)$$

Figure 10A:
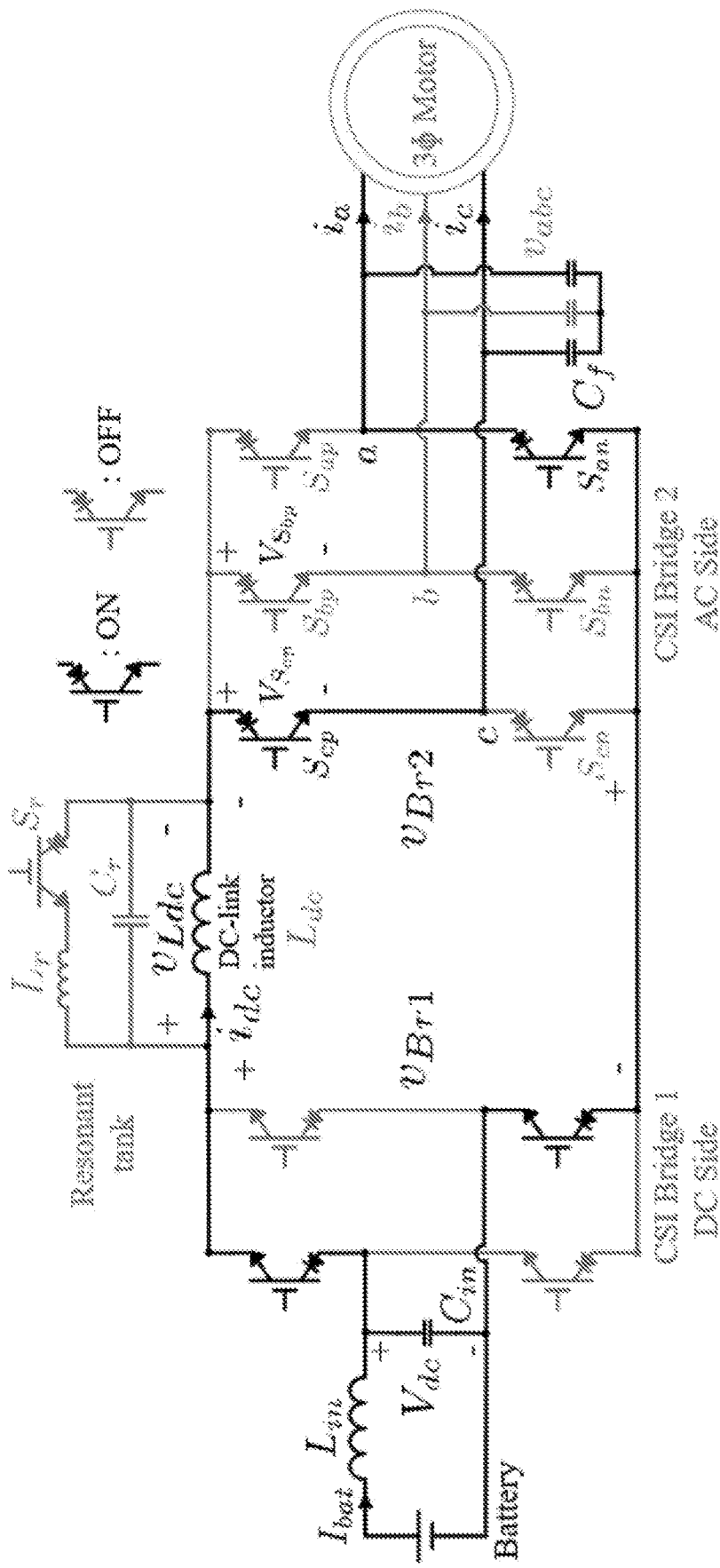
FIGS. 10A-C show the converter switching state before (10A), after (10B), and during (10C) a zero voltage switching transition, in accordance with an embodiment of the disclosure.
Figure 10B:
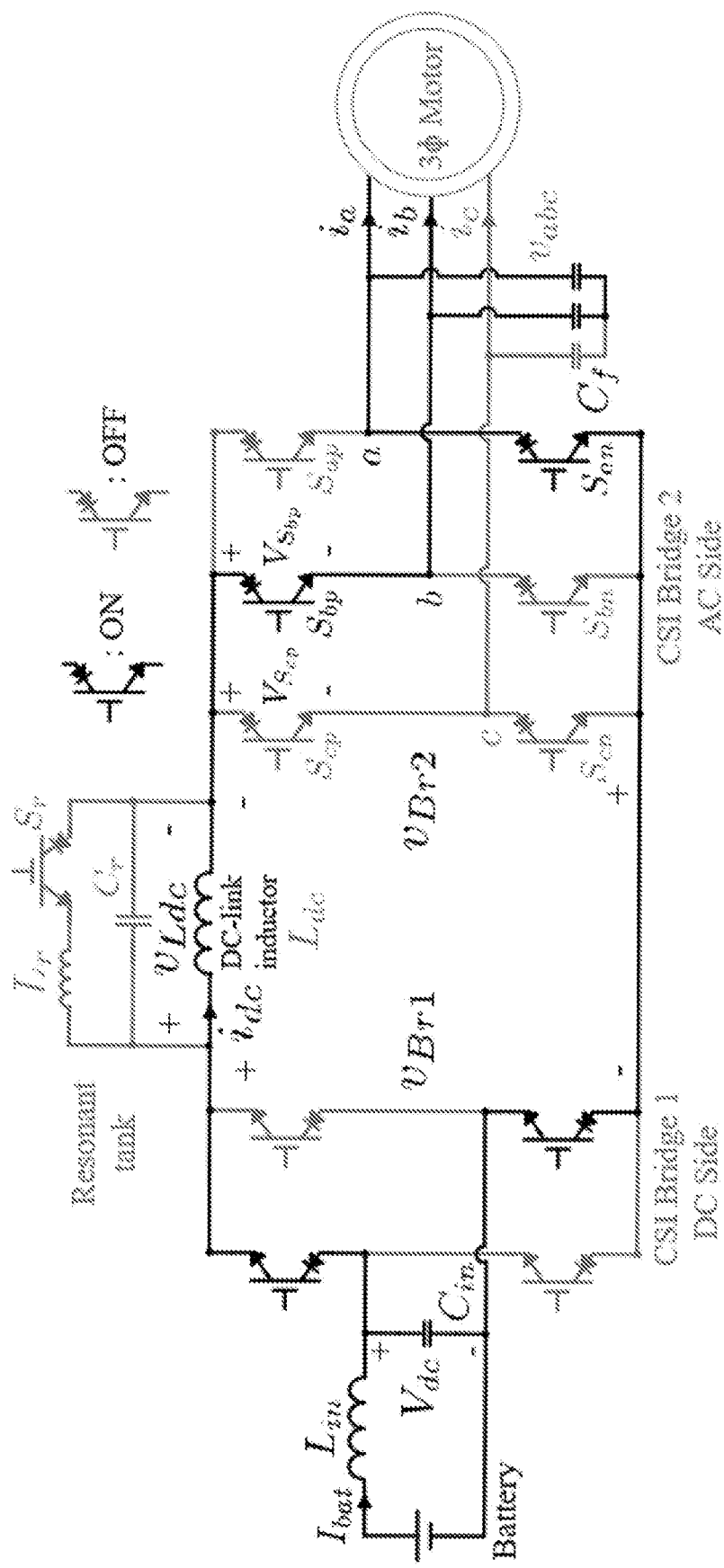
Figure 10C:
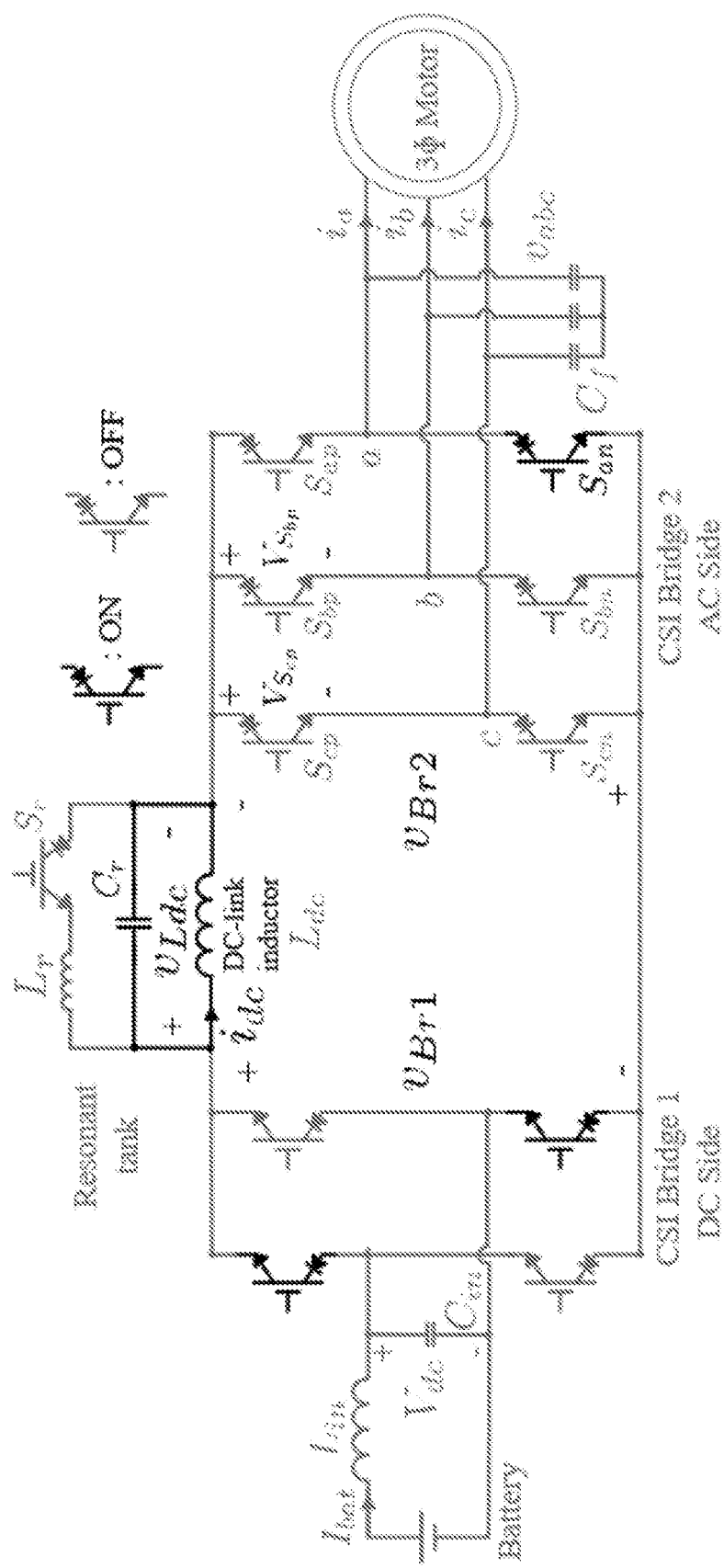

From the initial active phase with $(v_{Br1}, v_{Br2})=(+V_{dc}, V_{ac})$ shown in FIG. 10A, the ZVS transition state is initiated by gating OFF switch $S_{cp}$ and gating ON switch $S_{bp}$ with switch $S_{an}$ kept ON. Applying Kirchhoff's voltage law to the switching loop, the voltages across the two switch positions of interest are:

$$\begin{cases} V_{S_{cp}} = v_{Br1} - v_{Ldc} + V_{ac} \\ V_{S_{bp}} = v_{Br1} - v_{Ldc} + V_{ab} \end{cases} \quad (6)$$

where $V_{S_{cp}}$ and $V_{S_{bp}}$ are the voltages across switch position $S_{bp}$ and $S_{cp}$, respectively, $V_{ac}$ and $V_{ab}$ are the line-to-line voltages of the motor, and $v_{Br1}$ is the active vector applied by Bridge 1.

From (5) and (6), with the initial condition $V_{S_{cp}}=0$ from the previous switching state, $V_{S_{bp}}<0$ at the beginning of the ZVS transition state. This means that the series diode in switch position $S_{bp}$ is reverse biased and gating ON $S_{bp}$ does not effectively turn ON the switch position.

Thus, as soon as $S_{cp}$ turns OFF, the DC-link current $i_{dc}$ is forced to flow through the resonant capacitor $C_r$, as shown in FIG. 10C, discharging it such that:

$$\frac{dv_{Ldc}}{dt} = -\frac{i_{dc}}{C_r} \quad (7)$$

From (6) and (7), and recognizing that the dynamics of the load and source voltages can be neglected at the time scale of the ZVS transition state, it follows that the rate of change of the voltage across the two switches of interest is:

$$\frac{dV_{S_{bp}}}{dt} = \frac{dV_{S_{cp}}}{dt} = \frac{i_{dc}}{C_r} \quad (8)$$

Figure 11:
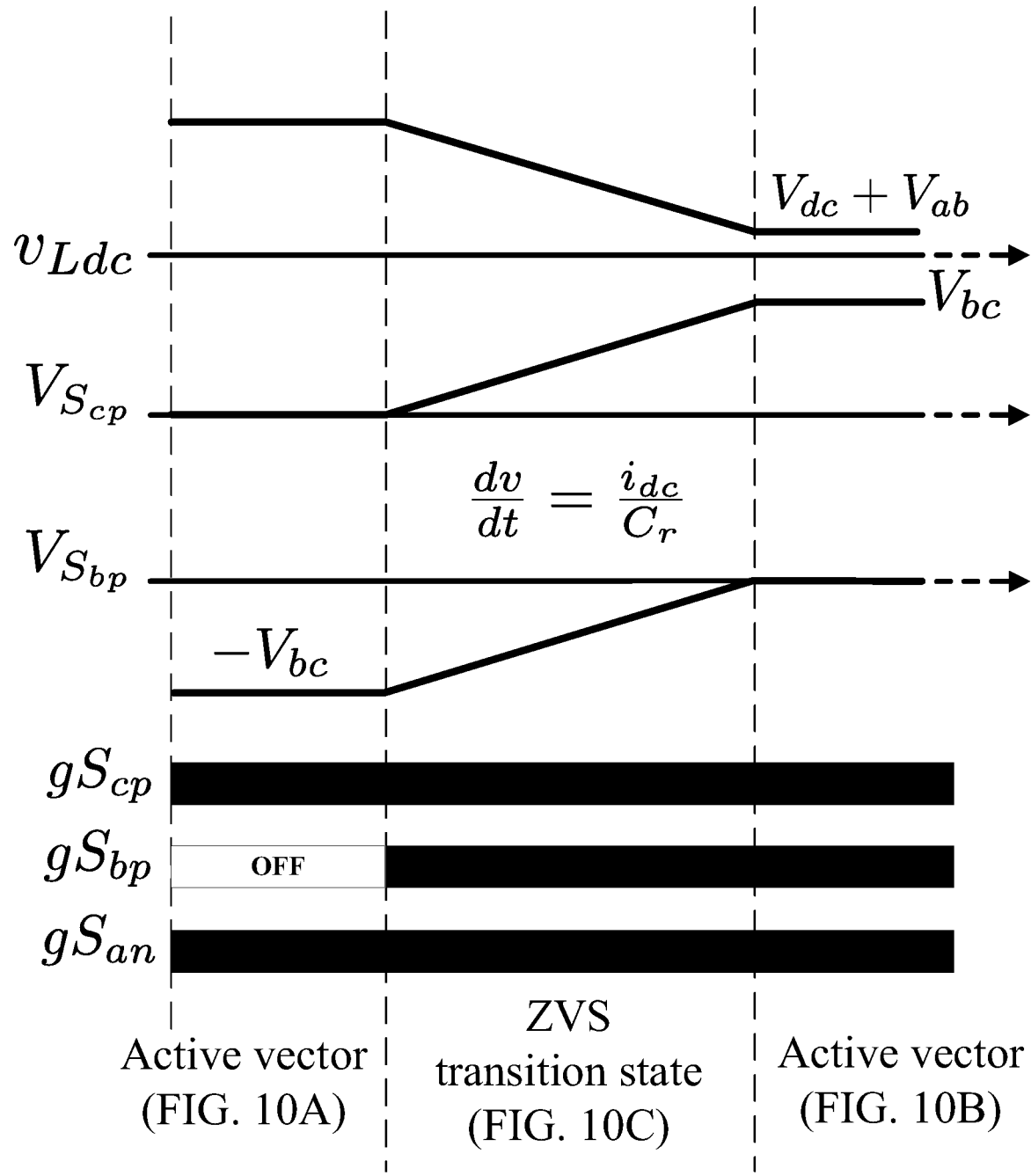
FIG. 11 shows switching waveforms and gating sequence during a zero voltage switching transition, in accordance with an embodiment of the disclosure.

Thus, during the ZVS transition state the dv/dt across the two commutating switch positions is controlled and can be set to any target value by appropriately selecting $C_r$ following (8). Once the resonant capacitor is discharged to the incoming combined active vector voltage level, $V_{dc}+V_{ab}$ in this case, the series diode in switch $S_{bp}$ becomes forward biased and the switch position starts conducting, leading to the subsequent converter active phase with $(v_{Br1}, v_{Br2})=(+V_{dc}, V_{ab})$ shown in FIG. 10B. This completes the ZVS state transition and the commutation between the active vectors has occurred with a ZVS turn OFF of the outgoing switch, $S_{cp}$ in this example, and a ZVS turn ON of the incoming switch, $S_{bp}$ in this case. The switching waveforms and gating sequence during the ZVS transition state of this example are summarized in FIG. 11.

The above derivations are based on assumption (5) holding true. This can be generalized into a necessary and sufficient condition to enable the soft-switching mechanism of the SSCSI as follows:

$$v_{Br_{incoming}} < v_{Br_{outgoing}} \quad (9)$$

where $v_{Br_{incoming}}$ is the voltage level of the incoming active vector to be applied by the bridge, and $v_{Br_{outgoing}}$ is the voltage level of the active vector from which the bridge is switching.

Condition (9) is a constraint unique to the SSCSI and can be enforced on a bridge basis by appropriately sequencing the active vectors throughout the switching cycle. This can be implemented using a modified Space Vector Modulation (SVM) scheme.

Over a switching cycle, once all the active vectors selected for a bridge have been applied, condition (9) cannot be verified and a Resonance phase can be used to flip the resonant capacitor voltage, and thus the DC-link voltage $V_{Ldc}$, to a voltage greater than the next incoming combined active vector voltage level. This is achieved by gating ON the ancillary switch as explained above, and is followed by a ZVS transition state where $v_{Ldc}$ decreases to the incoming voltage level. In cases where the initial resonant capacitor voltage before the resonance phase is not large enough to ensure that the DC-link voltage at the end of the resonance is larger than the incoming voltage level, an additional ZVS transition state can be inserted before gating ON the ancillary switch to further discharge the resonant capacitor, as shown in FIG. 9. This flexibility decouples the ZVS operation of the SSCSI from the input and output voltages and enables the soft-switching operation across the entire voltage, current and power range. To maximize the DC-link utilization, both bridges are applying their respective active vector sequence simultaneously. Thus, in the most general case, the instants where condition (9) cannot be enforced for Bridge 1 and Bridge 2 are not synchronized, and two resonance phases are used per switching cycle, one per bridge, as shown in FIG. 9.

Validation of Proposed Topology

To demonstrate the fundamental working principles of the SSCSI topology, a 25 kVA SSCSI in the EV drivetrain configuration shown in FIG. 8 is simulated with the parameters given in Table I. A V/f control is implemented to generate the set of AC output voltages with a frequency range of 0-500 Hz as the voltage magnitude is ramped up to the nominal value of 480 Vrms.

TABLE I

PARAMETERS OF THE SIMULATED 25 kVA SSCSI DRIVETRAIN

| Parameter | Value | Parameter | Value |
|---|---|---|---|
| Rated power | 25 kVA | $L_{dc}$ | 350 µH |
| Nominal battery voltage | 500 Vdc | $C_{in}$ & $C_f$ | 28 µF |
| Nominal output voltage | 480 Vrms LL | $L_{in}$ | 220 µH |
| Nominal DC-link current | 60 A | $C_r$ | 100 nF |
| Switching frequency | 15 kHz | $L_r$ | 2.8 µH |

Figure 12:
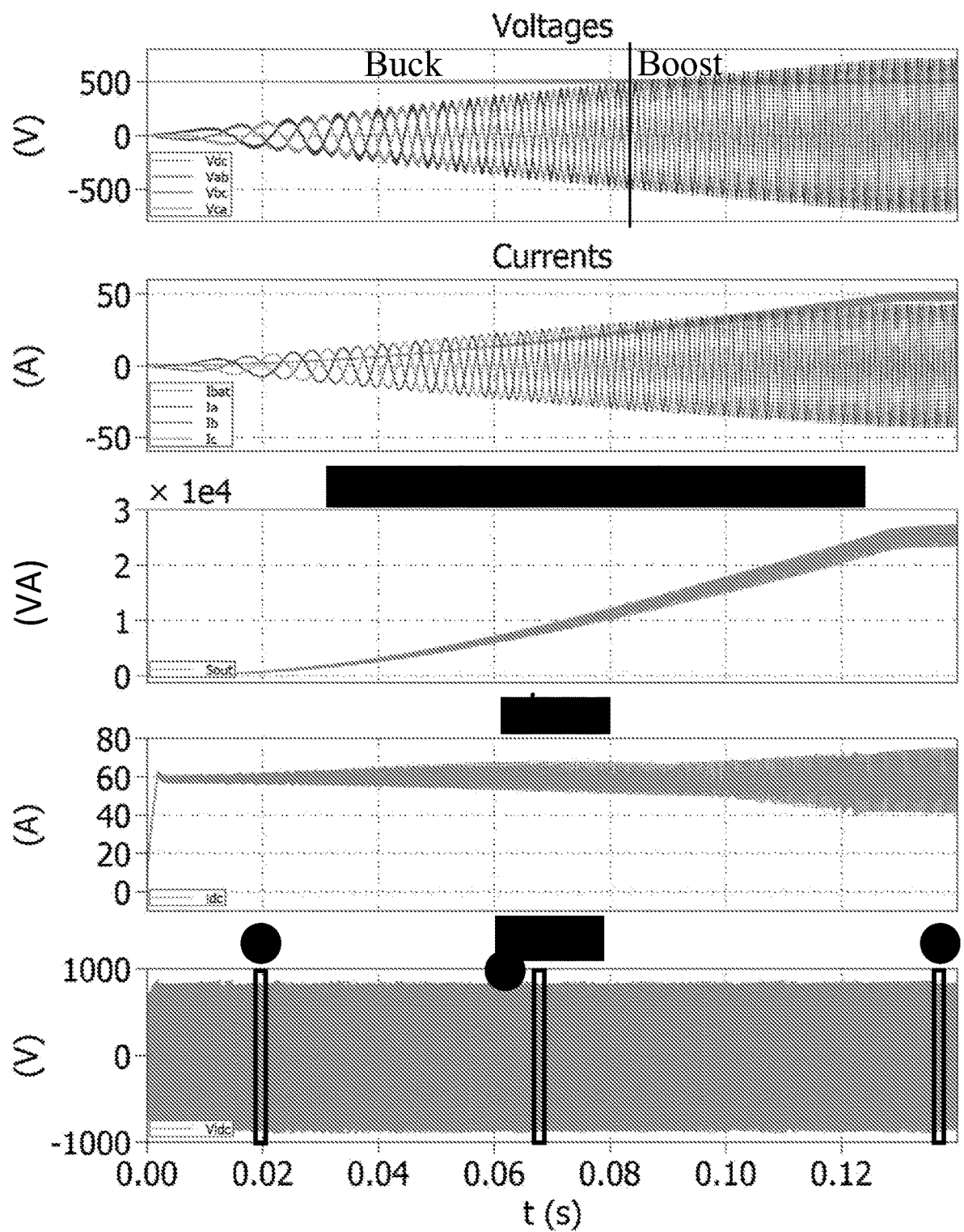
FIG. 12 shows simulation waveform of a 25 kVA SSCSI in a DC-to-3-phase AC conversion mode and under V/f control for an electric vehicle drivetrain application, showing stable buck and boost operation, in accordance with an embodiment of the disclosure.

In this simulation, the DC-link current level is kept constant at its nominal value of 60 A. The input voltage, $V_{dc}$, and battery current, Ibat, as well as the output bridge line-to-line voltages, $V_{ab}$, $V_{bc}$, $V_{ca}$, line currents, $I_a$, $I_b$, $I_c$, and resulting apparent power, $S_{out}$, are shown in FIG. 12. The DC-link current, $i_{dc}$, and voltage, $v_{Ldc}$, are also shown. The results validate the proper operation of the SSCSI under V/f control, with a stable and controlled DC-link current, soft-started from 0 A, while the magnitude and frequency of the output voltages increase from 0 pu to 1 pu in 130 ms.

The ramp-up time has been selected arbitrarily in this simulation to demonstrate the dynamic capabilities of the converter and can be coordinated with the motor and vehicle dynamics, with the understanding that shorter converter ramp-up times are possible but might not be appropriate for the system.

The input battery current increases proportionally to the output power to keep the DC-link current regulated to the nominal value, and no inrush current is observable at start-up. As identified in FIG. 12, this simulation study also confirms the operation of the SSCSI in both buck and boost voltage conversion modes, with the output voltages magnitude increasing seamlessly above the battery DC voltage. Additionally, the SSCSI generates high quality waveforms, with an output voltage and current THD at rated power and frequency of 5% and 2%, respectively, and an input battery current THD of 5.5%, in this simulation and for this design. As expected, the DC-link current ripple increases as the output power delivered reaches the nominal value, yet remains under the design target of 60% peak-to-peak at full power. This is achieved with a small DC-link inductor of 350 µH, representing a little under 1 J of stored energy at the 25 kVA operating point, more than an order of magnitude lower than the energy stored in the DC-bus of an equivalently rated VSI-based drivetrain, thus promising a power-dense and cost-effective design. A similar observation is also true for the input and output filters, with a combined capacitance of 112 µF for a total filter energy a little over 10 J.

Figure 13A:
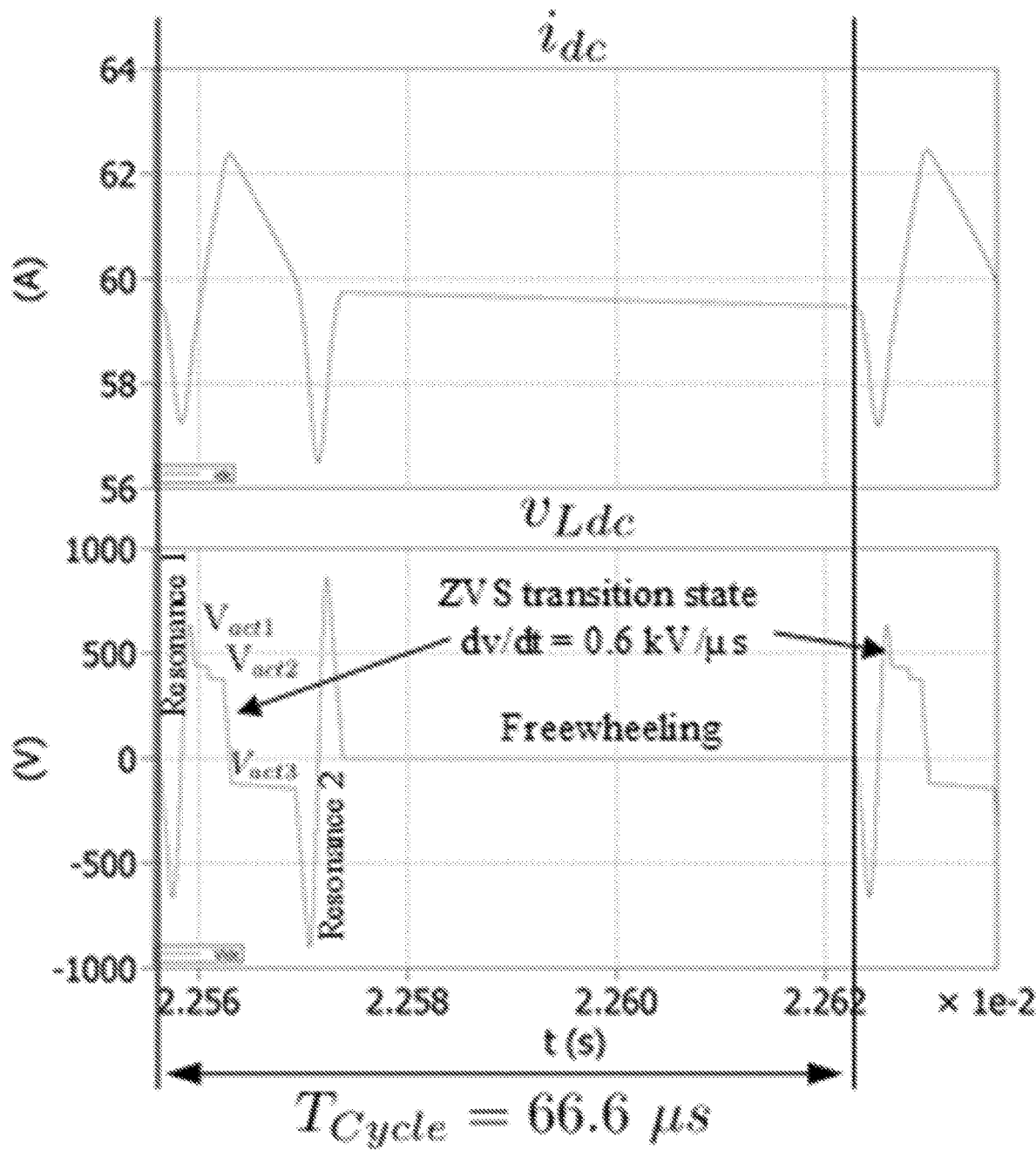
FIGS. 13A-C show SSCSI DC-link current, $i_{dc}$, and DC-link voltage, $V_{Ldc}$, over a switching period, in accordance with an embodiment of the disclosure.
Figure 13B:
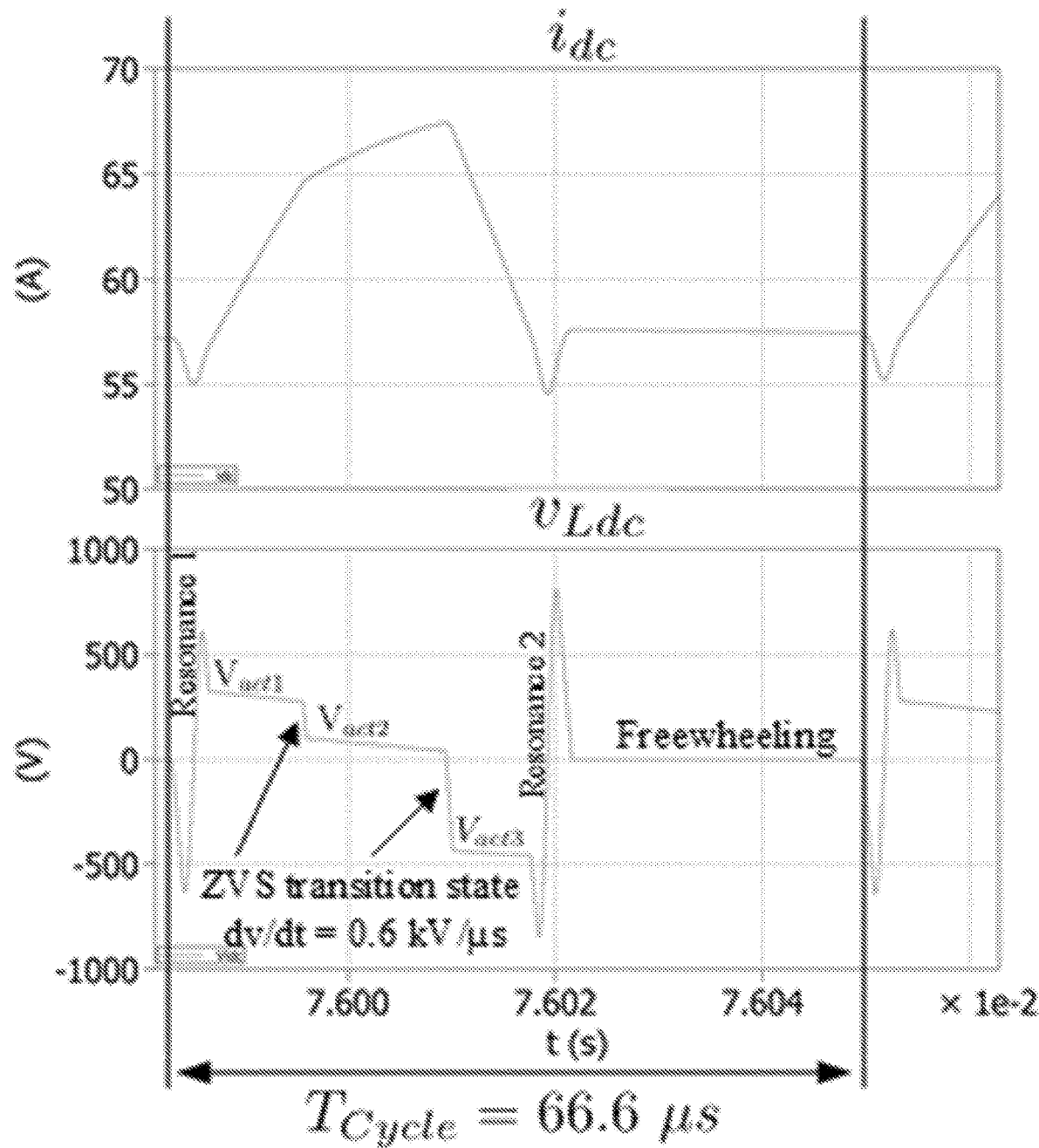

As shown in FIG. 12, the DC-link voltage, $v_{Ldc}$, is controlled within a ±850 V band throughout the simulation while the output voltage rises to the rated line-to-line voltage of 480 Vrms, from an initial value of 0 V. Thus the DC-link voltage stress is kept low and constant, at 1.25 pu in this study, across the entire voltage and load range. In addition, to confirm the soft-switching operation under different converter operating conditions, the DC-link current and voltage are observed over one switching cycle at the three instants identified in FIG. 12. The line-to-line output voltage, $V_{out}$, output apparent power $S_{out}$, and the conversion mode are summarized in Table II for the three observations, and the resulting waveforms are shown in FIG. 13.

TABLE II

OPERATING CONDITIONS OF THE DC-LINK SWITCHING WAVEFORMS OBSERVATIONS

| Observation | $V_{out}$ | $S_{out}$ | Conversion mode |
|---|---|---|---|
| 1 | 90 Vrms | 1 kVA | Buck |
| 2 | 300 Vrms | 10 kVA | Buck |
| 3 | 480 Vrms | 25 kVA | Boost |

In the three cases, the switching pattern is similar to the conceptual derivations described above, with the Active phase, the two Resonance phases and the Freewheeling phase clearly identified in the figure. Observation 1, FIG. 13A, and observation 2, FIG. 13B, both take place under buck conversion mode and the switching cycle sequences are identical. As the output power increases between 1 kVA to 10 kVA, the duration of the active phase increases and the duration of the freewheeling phase becomes shorter, as expected in this simulation study with constant DC-link current. Importantly, while the output voltage increases by more than a factor of three, from 90 Vrms to 300 Vrms, the voltage stress on $v_{Ldc}$ during the Resonance phases remains constant, and the soft-switching operation is maintained with a dv/dt rate of 0.6 kV/μs during the ZVS transition states.

Figure 13C:
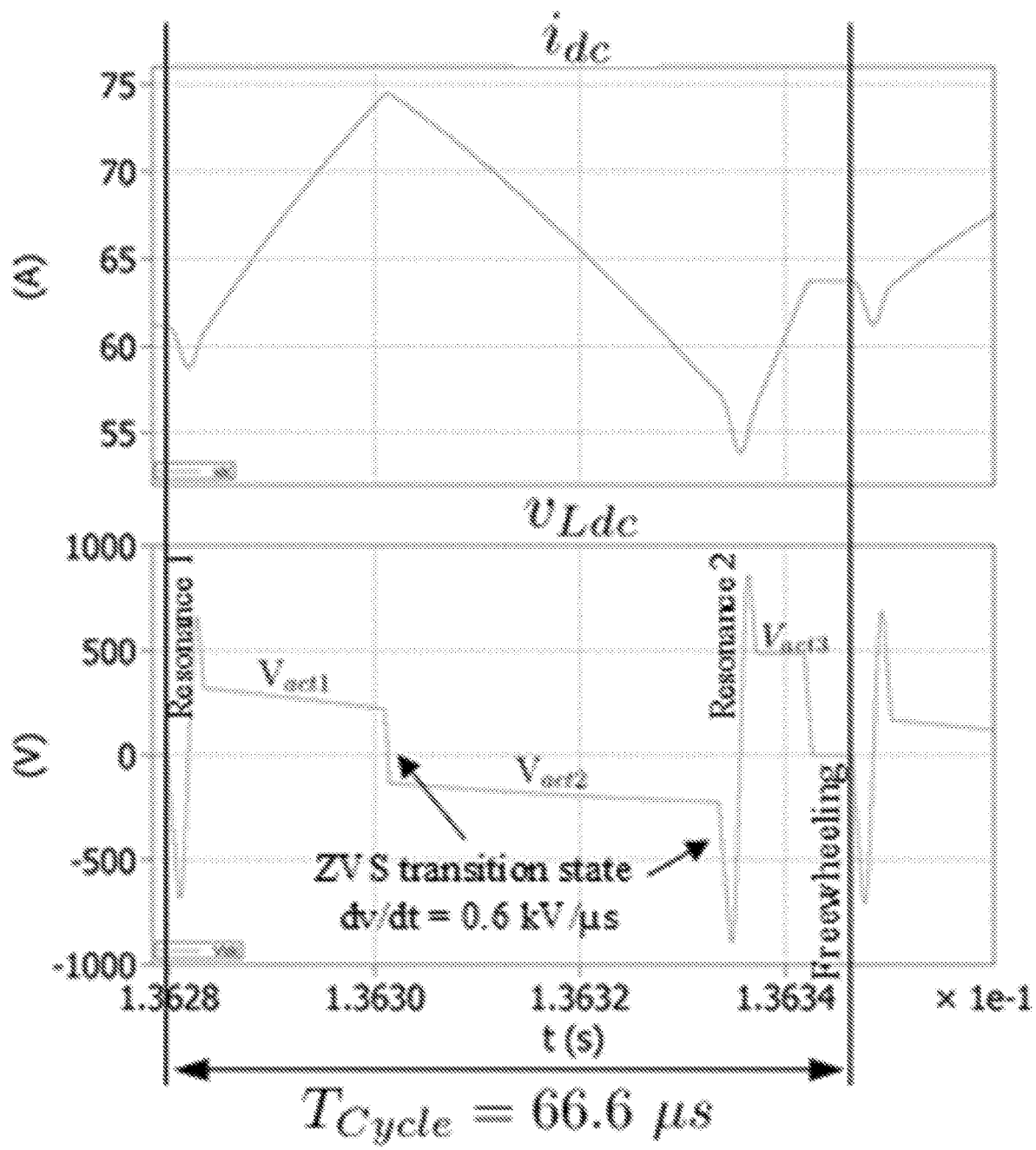

The DC-link waveforms for observation 3 at rated output voltage and power, 480 Vrms and 25 kVA, respectively, are shown in FIG. 13C. In this case, the SSCSI operates in boost conversion mode and the sequencing of $V_{act1}$, $V_{act2}$ and $V_{act3}$ is different from FIGS. 13A-B. Despite these radically different operating conditions, the voltage stress on $v_{Ldc}$ during the Resonance phase is unchanged and the soft-switching operation is once again achieved.

These three observations can be generalized and demonstrate the unique ability of the SSCSI to leverage the flexibility in the Resonance phase and the resonant switch control to guarantee the ZVS operation of all power devices, under all loading, current, and voltage conditions. This is crucial for an EV drivetrain application where wide output voltage and loading ranges are expected.

Figure 14:
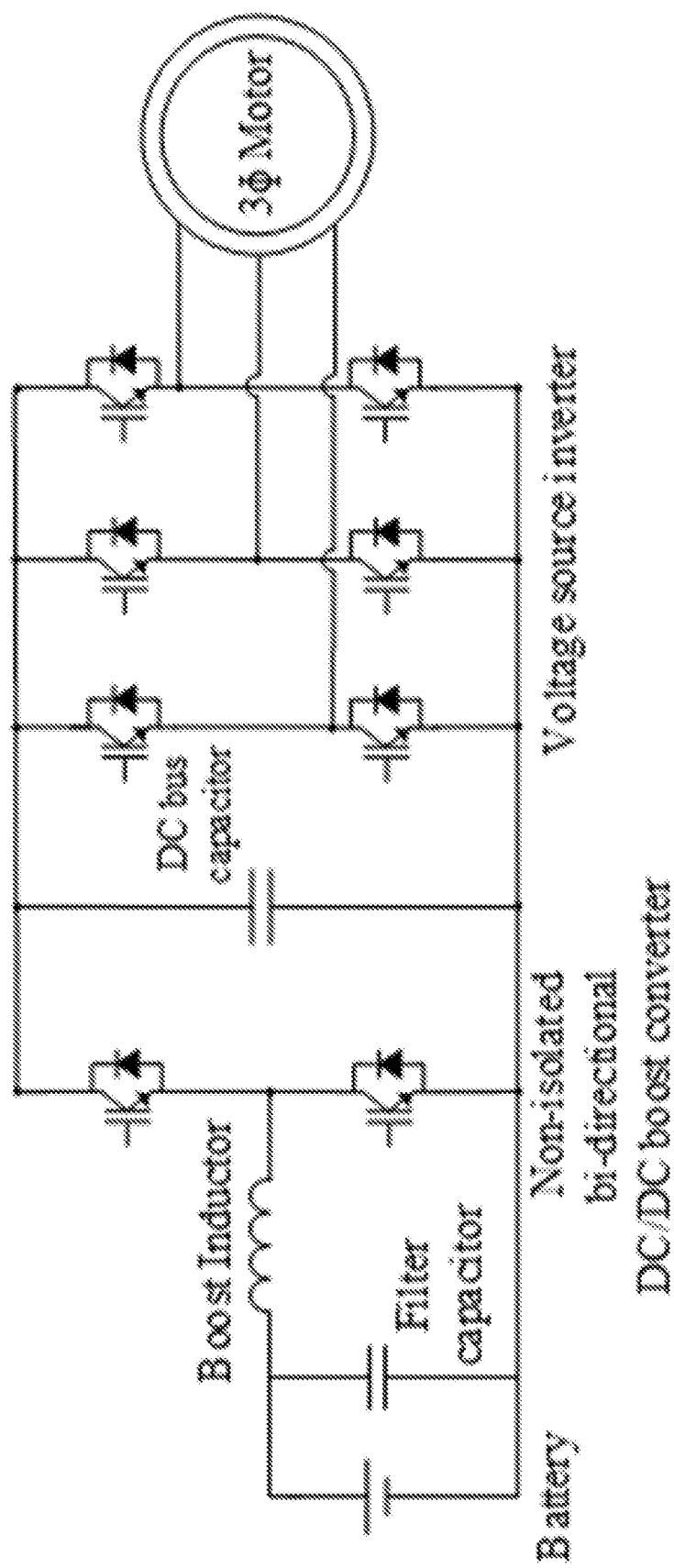
FIG. 14 shows a conventional electric vehicle drivetrain using DC-DC bi-directional boost converter coupled to a standard two-level voltage source inverter.

Comparison of the Efficiency of the Profiles of the Proposed SSCSI and Conventional VSI One of the attractive attributes, and enabling features of the SSCSI drivetrain is the unique efficiency profile of the topology. The conventional VSI-based drivetrain coupled to a bi-directional DC/DC boost converter, shown in FIG. 14 is widely used in commercial electric vehicles, and is taken as a baseline case in this section. For these VSI-based topologies, the DC-bus voltage can be controlled to some extent in order to modulate the switching losses and improve the conversion efficiency. However, the minimum DC-bus voltage is constrained by the battery and output voltage magnitudes, leaving little room for such a dynamic control of the bus voltage under varying loading conditions. In addition, the efficiency improvements are limited to the low-speed region of the motor where the required output voltage is well below the rated value. In sharp contrast, the fast dynamic of the SSCSI converter coupled to the current-source nature of the topology allows the DC-link current level to be precisely regulated as a function of the system's current loading, regardless of the input and output voltage levels. This leads to the unique SSCSI efficiency profile presented next.

Figure 15:
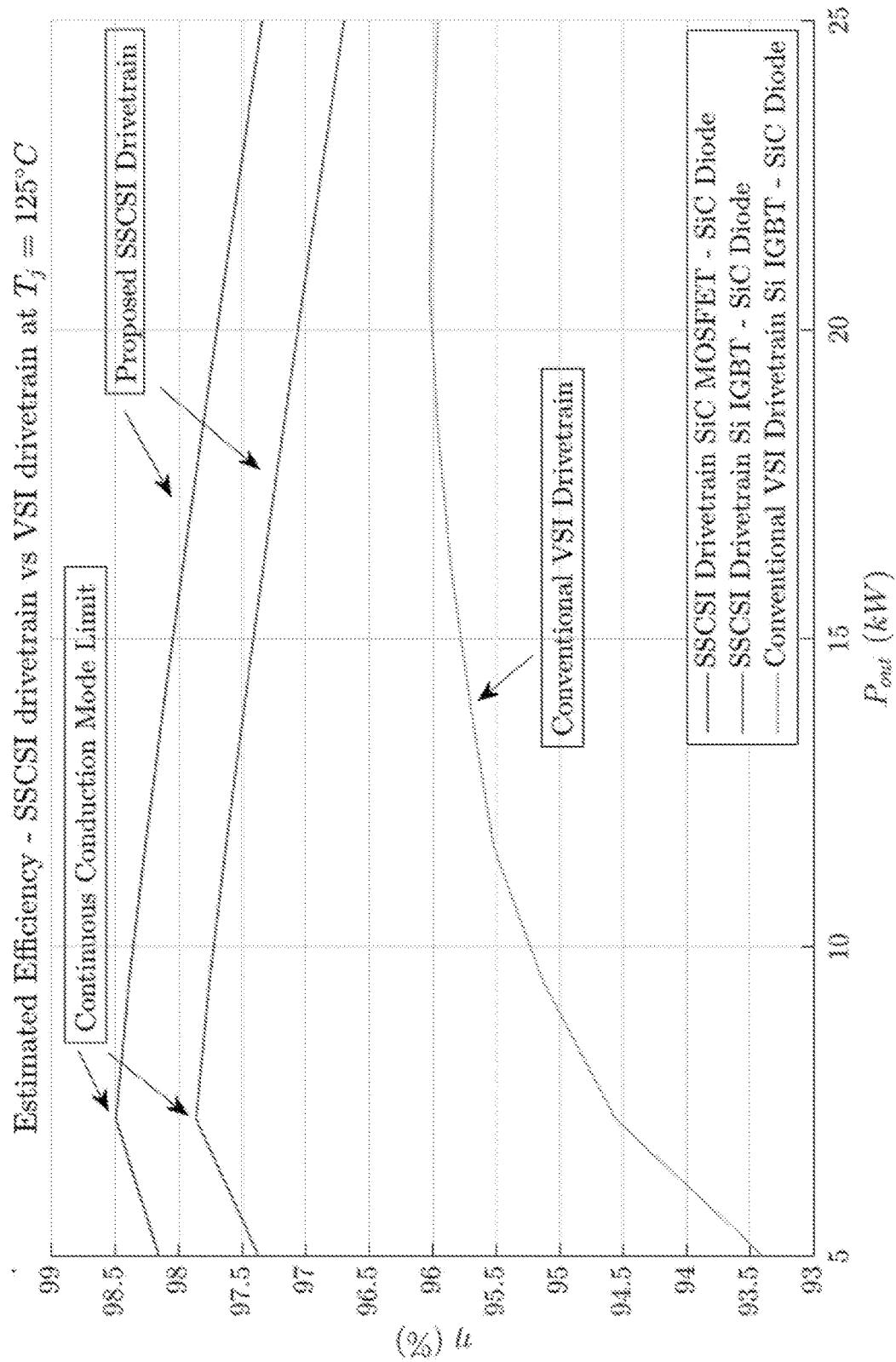
FIG. 15 shows calculated efficiency profiles at rated output voltage and under variable loading condition for an exemplary SSCSI electric vehicle drivetrain of the present disclosure and the conventional VSI electric vehicle drivetrain considering a 25 kVA design.

The efficiency profiles at nominal output voltage and under variable loading are calculated for the proposed SSCSI drivetrain and the conventional VSI-based drive using the parameters specified in Table III, and are shown in FIG. 15. Three commercially-available devices are modeled and used for the power semiconductor loss calculations. The parameters of interest are listed in Table IV and the junction temperatures are assumed to be constant at 125° C. for this comparative study. Two device configuration scenarios are considered for the SSCSI as labeled in FIG. 15. Both the switching and conduction losses are evaluated for the VSI drivetrain, while the switching losses are eliminated in the soft-switching SSCSI variant. The core and winding losses in the magnetics are accounted for and the capacitor losses are neglected in both cases. Finally, the DC-link voltage of the VSI drivetrain is kept constant at the rated value as the nominal output voltage is to be generated, while the DC-link current of the SSCSI is dynamically varied proportionally to the output power and current.

TABLE III

SYSTEM PARAMETERS USED IN THE EFFICIENCY PROFILES CALCULATIONS

| Parameter | SSCSI | VSI |
|---|---|---|
| Rated power | 25 kVA | 25 kVA |
| Nominal battery voltage | 500 Vdc | 500 Vdc |
| Nominal output voltage | 480 Vrms LL | 480 Vrms LL |
| Nominal DC-link | 50 A | 750 V |
| Switching frequency | 15 kHz | 15 kHz |

TABLE IV

MAIN PARAMETERS OF THE SEMICONDUCTORS CONSIDERED FOR THE EFFICIENCY CALCULATIONS, AT $T_j$ = 125° C.

Si IGBT, Infineon IGW60T120

| Breakdown voltage | Nominal current | Saturation voltage | Turn ON Energy | Turn OFF Energy |
|---|---|---|---|---|
| 1200 V | 60 A | 2.1 V (60 A) | 6.4 mJ (600 V, 60 A) | 9.4 mJ (600 V, 60 A) |

SiC MOSFET, Cree C3M0016120D

| Breakdown voltage | Nominal current | On-state resistance |
|---|---|---|
| 1200 V | 85 A | 24 mΩ |

SiC Schottky diode, On Semiconductor FFSH50120A

| Breakdown voltage | Nominal current | Forward voltage drop | Total capacitive charge |
|---|---|---|---|
| 1200 V | 77 A | 1.95 V (50 A) | 250 nC (800 V, 25° C.) |

As seen in FIG. 15, using the same Si IGBT and SiC diode, in a series configuration for the SSCSI and an anti-parallel configuration for the VSI, the efficiency of the proposed SSCSI powertrain is higher than the conventional VSI solution throughout the entire power range. Thus, despite the apparent double voltage drop penalty in the SSCSI topology due to the series connection of two devices to realize the reverse-blocking switch, the elimination of the switching losses leads to higher conversion efficiency, at the switching frequencies considered. In addition, although non-standard, this series switch configuration can easily be realized with existing power module technologies through simple reconfiguration of the dies' interconnections to lead to higher converter integration.

Owing to the soft-switching operation with intrinsic dv/dt control, replacing the Si IGBTs with SiC MOSFETs is greatly facilitated in the SSCSI topology, and leads to even higher efficiency as shown in FIG. 15. Furthermore, while the traditional VSI motor drive operates at peak efficiency near the maximum power region, the SSCSI drivetrain efficiency increases with a decreasing output power, thanks to the dynamic DC-link current regulation. This trend continues until the limit of the continuous conduction mode is reached, typically at 30% of the nominal load, and the DC-link current cannot be reduced further, at which point the efficiency starts decreasing. In addition, it is important to note that due to the soft-switching operation, the loss profile of the SSCSI is essentially independent of the output voltage, and in turn of the motor speed, and similar efficiency trends can thus be expected across the entire voltage and motor speed ranges. Therefore, the SSCSI can be expected to outperform existing solutions on a typical driving cycle.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A current source inverter (CSI) comprising:
a first CSI bridge operatively connected to a first power bank;
a second CSI bridge operatively connected to a second power bank;
a DC-link inductor connected in series between the first and second CSI bridges;
a resonant tank comprising a resonant capacitor connected in parallel with the DC-link inductor; and
a leakage management diode connected in series between the DC-link inductor and the resonant tank;
wherein the leakage management diode is configured so that current generated by the DC-link inductor flows through the leakage management diode to discharge the resonant capacitor.

2. The CSI of claim 1, wherein the first power bank is selected from the group consisting of being configured to: source power, to sink power, and both to source and sink power.

3. The CSI of claim 1, wherein the second power bank selected from the group consisting of being configured to: source power, to sink power, and both to source and sink power.

4. The CSI of claim 1, wherein the resonant tank further comprises:
a resonant switch; and
resonant inductor connected in series with the resonant switch;
wherein the serially connected resonant inductor and resonant switch are connected in parallel with the resonant capacitor.

5. The CSI of claim 4, wherein the resonant switch is a reverse blocking switch.

6. The CSI of claim 1 further comprising one or more filter capacitors;
wherein the first CSI bridge comprises two or more legs;
wherein each of the two or more legs comprise two reverse blocking switches connected in series;
wherein the one or more filter capacitors are connected between the two or more legs of the first CSI bridge; and
wherein one or more of the two reverse blocking switches comprises a controllable switch comprising a material selected from the group consisting of silicon, silicon carbide, gallium nitride, wide-bandgap semiconductors, and combinations thereof, connected in series to a diode comprising a material selected from the group consisting of silicon, silicon carbide, gallium nitride, wide-bandgap semiconductors, and combinations thereof.

7. The CSI of claim 6, wherein the controllable switch is an insulated gate bipolar transistor or a metal oxide semiconductor field effect transistor.

8. The CSI of claim 1 further comprising one or more filter capacitors;
wherein the second CSI bridge comprises two or more legs;
wherein each of the two or more legs comprise two reverse blocking switches;
wherein the one or more filter capacitors are connected between the two or more legs of the second CSI bridge; and
wherein one or more of the two reverse blocking switches comprises a controllable switch comprising a material selected from the group consisting of silicon, silicon carbide, gallium nitride, wide-bandgap semiconductors, and combinations thereof, connected in series to a diode comprising a material selected from the group consisting of silicon, silicon carbide, gallium nitride, wide-bandgap semiconductors, and combinations thereof.

9. The CSI of claim 1, wherein the CSI is configured to operate in a switching cycle comprising an active phase and a freewheeling phase;
wherein during at least a portion of the active phase, power is transferred simultaneously between:
the first power bank and the DC-link inductor via the first CSI bridge; and
the second power bank and the DC-link inductor via the second CSI bridge; and
wherein during the freewheeling phase, no power is transferred between the DC-link inductor and the first and second power banks.

10. The CSI of claim 9, wherein each of the first and second CSI bridges comprises two or more legs;

wherein each of the two or more legs comprise a first switch and a second switch; and wherein during the freewheeling phase, the first and second switches of a first leg of the first CSI bridge are gated-on and the first and second switches of a first leg of the second CSI bridge are gated-on.

11. The CSI of claim 9, wherein the resonant tank further comprises:
a resonant switch; and
a resonant inductor connected in series with the resonant switch;
wherein the serially connected resonant inductor and resonant switch are connected in parallel with the resonant capacitor;
wherein the first CSI bridge comprises a first plurality of switches for delivering electric power between the first power bank and the DC-link inductor;
wherein the second CSI bridge comprises a second plurality of switches for delivering electric power between the second power bank and the DC-link inductor; and
wherein the switching cycle further comprises a resonant phase during which the first and second pluralities of switches are gated-off and the resonant switch is gated-on, initiating a resonance between the resonant capacitor and the resonant inductor.

12. The CSI of claim 11, wherein the switching cycle further comprises a switching period; and
wherein the resonant phase comprises less than 10% of the switching period.

13. The CSI of claim 9, wherein the resonant tank further comprises:
a resonant switch; and
a resonant inductor connected in series with the resonant switch;
wherein the serially connected resonant inductor and resonant switch are connected in parallel with the resonant capacitor;
wherein the first CSI bridge comprises a first plurality of switches for delivering electric power between the first power bank and the DC-link inductor;
wherein the second CSI bridge comprises a second plurality of switches for delivering electric power between the second power bank and the DC-link inductor; and
wherein the switching cycle further comprises one or more zero voltage switching transition states during which at least one of the first or second pluralities of switches are gated-off, the resonant switch is gated-off, and current generated by the DC-link inductor flows through the resonant capacitor.

14. The CSI of claim 1, wherein the CSI has a DC-link current utilization factor between 0.9 and 1.0.

15. A current source inverter (CSI) comprising:
a first CSI bridge operatively connected to a first power bank;
a second CSI bridge operatively connected to a second power bank;
a first DC-link inductor connected in series between the first and second CSI bridges;
a first resonant tank connected in parallel with the first CSI bridge;
a first leakage management diode connected in series with the first resonant tank;
a second resonant tank connected in parallel with the second CSI bridge; and
a second leakage management diode connected in series with the second resonant tank;

wherein the CSI is configured to operate in a switching cycle;
wherein the switching cycle comprises an active phase and a freewheeling phase;
wherein during at least a portion of the active phase, power is transferred simultaneously between:
the first power bank and the first DC-link inductor via the first CSI bridge; and
the second power bank and the first DC-link inductor via the second CSI bridge; and
wherein during the freewheeling phase, no power is transferred between the first DC-link inductor and the first and second power banks.

16. The CSI of claim 15, wherein the first power bank is selected from the group consisting of a power source, a power load, and both a power source and a power load; and
wherein the second power bank is selected from the group consisting of a power source, a power load, and both a power source and a power load.

17. The CSI of claim 15, wherein the first resonant tank comprises a first resonant capacitor, a first resonant inductor, and a first resonant switch;
wherein the second resonant tank comprises a second resonant capacitor, a second resonant inductor, and a second resonant switch;
wherein the first resonant capacitor is connected in parallel with the first CSI bridge through the serially connected first leakage management diode;
wherein the second resonant capacitor is connected in parallel with the second CSI bridge through the serially connected second leakage management diode;
wherein the first resonant inductor is connected in series with the first resonant switch; and
wherein the second resonant inductor is connected in series with the second resonant switch.

18. The CSI of claim 17, wherein the serially connected first resonant switch and first resonant inductor are connected in parallel with the first resonant capacitor; and
wherein the serially connected second resonant switch and second resonant inductor are connected in parallel with the second resonant capacitor.

19. The CSI of claim 17, wherein the first resonant switch is a reverse blocking switch; and
wherein the second resonant switch is a reverse blocking switch.

20. The CSI of claim 15 further comprising one or more filter capacitors;
wherein the first CSI bridge comprises two or more legs;
wherein each of the two or more legs comprise two reverse blocking switches connected in series;
wherein the one or more filter capacitors are connected between the two or more legs of the first CSI bridge; and
wherein one or more of the two reverse blocking switches comprises a controllable switch comprising a material selected from the group consisting of silicon, silicon carbide, gallium nitride, wide-bandgap semiconductors, and combinations thereof, connected in series to a diode comprising a material selected from the group consisting of silicon, silicon carbide, gallium nitride, wide-bandgap semiconductors, and combinations thereof.

21. The CSI of claim 20, wherein the controllable switch is an insulated gate bipolar transistor or a metal oxide semiconductor field effect transistor.

22. The CSI of claim 15 further comprising one or more filter capacitors;

wherein the second CSI bridge comprises two or more legs;
wherein each of the two or more legs comprise two reverse blocking switches connected in series;
wherein the one or more filter capacitors are connected between the two or more legs of the second CSI bridge; and
wherein one or more of the two reverse blocking switches comprises a controllable switch comprising a material selected from the group consisting of silicon, silicon carbide, gallium nitride, wide-bandgap semiconductors, and combinations thereof, connected in series to a diode comprising a material selected from the group consisting of silicon, silicon carbide, gallium nitride, wide-bandgap semiconductors, and combinations thereof.

23. The CSI of claim 22, wherein the controllable switch is an insulated gate bipolar transistor or a metal oxide semiconductor field effect transistor.

24. The CSI of claim 17 further comprising a second DC-link inductor connected in series between the first and second CSI bridges;
wherein the second DC-link inductor is not connected in series with the first DC-link inductor.

25. The CSI of claim 15, wherein each of the first and second CSI bridges comprises two or more legs;
wherein each of the two or more legs comprise a first switch and a second switch; and
wherein during the freewheeling phase, the first and second switches of a first leg of the first CSI bridge are gated-on and the first and second switches of a first leg of the second CSI bridge are gated-on.

26. The CSI of claim 17, wherein the first CSI bridge comprises a first plurality of switches for delivering electric power between the first power bank and the first DC-link inductor;
wherein the second CSI bridge comprises a second plurality of switches for delivering electric power between the second power bank and the first DC-link inductor; and
wherein the switching cycle further comprises a resonant phase during which at least one of the first or second pluralities of switches are gated-off and at least one of the first or second resonant switches is gated-on, initiating at least one of a resonance between the first resonant capacitor and the first resonant inductor or a resonance between the second resonant capacitor and the second resonant inductor.

27. The CSI of claim 26, wherein at least one of:
the switching cycle further comprises a switching period, wherein the resonant phase comprises less than 10% of the switching period; or
the CSI has a DC-link current utilization factor between 0.9 and 1.0.

28. The CSI of claim 17, wherein the CSI is configured to operate in a switching cycle;
wherein the first CSI bridge comprises a first plurality of switches for delivering electric power between the first power bank and the first DC-link inductor;
wherein the second CSI bridge comprises a second plurality of switches for delivering electric power between the second power bank and the first DC-link inductor; and
wherein the switching cycle comprises one or more zero voltage switching transition states during which at least one of the first or second pluralities of switches are gated-off, the first and second resonant switches are gated-off, and current generated by the first DC-link inductor flows through at least one of the first resonant capacitor or the second resonant capacitor.

29. A current source inverter (CSI) comprising:
a first CSI bridge operatively connected to a first power bank;
a second CSI bridge operatively connected to a second power bank;
a first DC-link inductor connected in series between the first and second CSI bridges;
a second DC-link inductor connected in series between the first and second CSI bridges;
a first resonant tank connected in parallel with the first CSI bridge; and
a second resonant tank connected in parallel with the second CSI bridge;
wherein the second DC-link inductor is not connected in series with the first DC-link inductor; and
wherein at least one of:
(i) the CSI further comprises a leakage management diode connected in series between the first DC-link inductor and the first resonant tank, wherein the leakage management diode is configured so that current generated by the first DC-link inductor flows through the leakage management diode to discharge a first resonant capacitor of the first resonant tank;
(ii) the CSI further comprises:
a first leakage management diode connected in series with the first resonant tank; and
a second leakage management diode connected in series with the second resonant tank; or
(iii) the CSI has a DC-link current utilization factor between 0.9 and 1.0, the DC-link current utilization factor defined as the ratio of a maximum instantaneous current delivered to a respective power bank by a respective CSI bridge to an average of the first DC-link inductor current.

30. The CSI of claim 1, wherein:
the CSI is configured to operate in a switching cycle comprising one or more zero voltage switching transition states, an active phase, a freewheeling phase, a resonant phase and a switching period;
the resonant tank further comprises a resonant switch and a resonant inductor connected in series with the resonant switch;
the serially connected resonant switch and resonant inductor are connected in parallel with the resonant capacitor;
the first CSI bridge comprises a first plurality of switches for delivering electric power between the first power bank and the DC-link inductor;
the second CSI bridge comprises a second plurality of switches for delivering electric power between the second power bank and the DC-link inductor;
during one or more of the zero voltage switching transition states, at least one of the first or second pluralities of switches are gated-off, the resonant switch is gated-off, and the current generated by the DC-link inductor flows through the resonant capacitor;
during at least a portion of the active phase, power is transferred simultaneously between:
the first power bank and the DC-link inductor via the first CSI bridge; and
the second power bank and the DC-link inductor via the second CSI bridge;

during the freewheeling phase, no power is transferred between the DC-link inductor and the first and second power banks; and during the resonant phase, at least one of the first plurality of switches or the second plurality of switches are gated-off and the resonant switch is gated-on, initiating a resonance between the resonant capacitor and the resonant inductor.

31. A current source inverter (CSI) comprising:
a first CSI bridge comprising a first plurality of switches and operatively connected to a first power bank;
a second CSI bridge comprising a second plurality of switches and operatively connected to a second power bank;
a first DC-link inductor connected in series between the first and second CSI bridges, the first and second plurality of switches for delivering electric power between the first and second power banks and the first DC-link inductor;
a first resonant tank; and
at least one of:
(i) a leakage management diode connected in series between the first DC-link inductor and the resonant tank, wherein the leakage management diode is configured so that current generated by the first DC-link inductor flows through the leakage management diode to discharge a first resonant capacitor of the first resonant tank;
(ii) a first leakage management diode connected in series with the first resonant tank, the serially connected first resonant tank and first leakage management diode connected in parallel with the first CSI bridge, a second resonant tank, and a second leakage management diode connected in series with the second resonant tank, the serially connected second leakage management diode and second resonant tank connected in parallel with the second CSI bridge; or
(iii) a second DC-link inductor connected in series between the first and second CSI bridges, wherein the second DC-link inductor is not connected in series with the first DC-link inductor;
wherein:
a DC-link current utilization factor is defined as the ratio of a maximum instantaneous current delivered to a respective power bank by a respective CSI bridge to an average of the first DC-link inductor current; and
the CSI has a DC-link current utilization factor between 0.9 and 1.0.

32. The CSI of claim 31 further comprising one or more filter capacitors;
wherein:
one of the first CSI bridge and the second CSI bridge comprises two or more legs;
each of the two or more legs comprise two reverse blocking switches;
the one or more filter capacitors are connected between the two or more legs of the one of the first CSI bridge and the second CSI bridge; and
one or more of the two reverse blocking switches comprises a controllable switch comprising a material selected from the group consisting of silicon, silicon carbide, gallium nitride, wide-bandgap semiconductors, and combinations thereof, connected in series to a diode comprising a material selected from the group consisting of silicon, silicon carbide, gallium nitride, wide-bandgap semiconductors, and combinations thereof.

33. The CSI of claim 31 further comprising one or more additional inductors;
wherein:
the first CSI bridge comprises two or more legs, and at least one of the additional inductors is connected in series between the first power bank and the two or more legs of the first CSI bridge;
the second CSI bridge comprises two or more legs, and at least one of the additional inductors is connected in series between the second power bank and the two or more legs of the second CSI bridge; or
both the first and second CSI bridge each comprise two or more legs, at least one of the additional inductors being connected in series between the first power bank and the two or more legs of the first CSI bridge, and at least another one of the additional inductors being connected in series between the second power bank and the two or more legs of the second CSI bridge.

34. The CSI of claim 31, wherein the first resonant tank comprises:
a first resonant capacitor;
a first resonant switch; and
a first resonant inductor connected in series with the first resonant switch;
wherein the serially connected first resonant switch and first resonant inductor are connected in parallel with the first resonant capacitor.

35. The CSI of claim 34, wherein:
the CSI is configured to operate in a switching cycle; and
the switching cycle comprises one or more zero voltage switching transition states during which at least one of the first pluralities of switches or the second pluralities of switches are gated-off, at least one of the first resonant switch or a second resonant switch of a second resonant tank is gated-off, and current generated by the first DC-link inductor flows through at least one of the first resonant capacitor or a second resonant capacitor of a second resonant tank.

36. The CSI of claim 34, wherein:
the CSI is configured to operate in a switching cycle comprising an active phase, a freewheeling phase, a resonant phase and a switching period;
during at least a portion of the active phase, power is transferred simultaneously between:
the first power bank and the first DC-link inductor via the first CSI bridge; and
the second power bank and the first DC-link inductor via the second CSI bridge;
during the freewheeling phase, no power is transferred between the first DC-link inductor and the first and second power banks; and
during the resonant phase, one of the first pluralities of switches or the second pluralities of switches are gated-off and one of the first resonant switch or a second resonant switch of a second resonant tank is gated-on, initiating a resonance between one of the first resonant capacitor or a second resonant capacitor of a second resonant tank and one of the first resonant inductor or a second resonant inductor of a second resonant tank.

37. The CSI of claim 34 further comprising a second resonant tank connected in parallel with the second CSI bridge;
wherein:
the first resonant tank is connected in parallel with the first CSI bridge;
the CSI is configured to operate in a switching cycle;

the second resonant tank comprises a second resonant capacitor connected in parallel with the second CSI bridge and a second resonant inductor connected in series with a second resonant switch, and wherein the serially connected second resonant switch and second resonant inductor are connected in parallel with the second resonant capacitor; and the switching cycle comprises one or more zero voltage switching transition states during which at least one of the first or second pluralities of switches are gated-off, the first and second resonant switches is gated-off, and current generated by the first DC-link inductor flows through at least one of the first resonant capacitor or the second resonant capacitor.

\* \* \* \* \*